(12) United States Patent
Kim et al.

(10) Patent No.: US 9,212,241 B2
(45) Date of Patent: Dec. 15, 2015

(54) OPTICAL FILM AND DISPLAY DEVICE INCLUDING SAME

(71) Applicants: SAMSUNG ELECTRONICS CO., LTD., Suwon-si, Gyeonggi-do (KR); CHEIL INDUSTRIES INC., Kumi, Kyungsangbuk-do (KR)

(72) Inventors: Hyung Jun Kim, Suwon-si (KR); Moon Yeon Lee, Osan-si (KR); Kyu Yeol In, Seoul (KR); Woo Joong Kim, Uiwang-si (KR); Jong Hoon Won, Yongin-si (KR); Myung Sup Jung, Seongnam-si (KR); Won Cheol Jung, Seoul (KR)

(73) Assignees: SAMSUNG ELECTRONICS CO., LTD. (KR); CHEIL INDUSTRIES INC. (KR)

( * ) Notice: Subject to any disclaimer, the term of this patent is extended or adjusted under 35 U.S.C. 154(b) by 210 days.

(21) Appl. No.: 13/728,971

(22) Filed: Dec. 27, 2012

(65) Prior Publication Data
US 2013/0172503 A1    Jul. 4, 2013

(30) Foreign Application Priority Data
Dec. 28, 2011    (KR) .................. 10-2011-0144955

(51) Int. Cl.
*C08F 134/02*    (2006.01)
*C08F 212/08*    (2006.01)
*C08F 234/02*    (2006.01)

(52) U.S. Cl.
CPC .............. *C08F 134/02* (2013.01); *C08F 212/08* (2013.01); *C08F 234/02* (2013.01)

(58) Field of Classification Search
CPC .................................................... C08F 134/02
See application file for complete search history.

(56) References Cited

U.S. PATENT DOCUMENTS

| | | |
|---|---|---|
| 3,954,913 A | 5/1976 | Uebele et al. |
| 2010/0182547 A1 | 7/2010 | Ryu et al. |
| 2010/0272971 A1 | 10/2010 | Miyai et al. |
| 2013/0165609 A1* | 6/2013 | Kim et al. ............... 526/259 |

FOREIGN PATENT DOCUMENTS

| | | |
|---|---|---|
| CN | 101698694 A | 4/2010 |
| EP | 0516987 A1 | 5/1992 |
| JP | 1989-311112 A | 12/1989 |
| JP | 2001-194668 A | 7/2001 |
| KR | 1020080036406 A | 4/2008 |
| KR | 1020080097018 A | 11/2008 |
| KR | 1020100106450 A | 10/2010 |

OTHER PUBLICATIONS

Hayashi, Y. et al., The HfCl4-Mediated Diels-Alder Reaction of Furan, Angew. Chem., Int. Ed. 2002, 41: 4079-4081.
Xawkat, A. et al., Furans-Maleimides Diels-Alder Reactions in Protic Ionic Liquid, Chem. Res. Chinese Universities 2009, 25(2): 161-168.
Zibinsky, M. et al., N-Amino-exo-3,6-epoxy-1,2,3,6-tetrahydrophthalimide as an Active Aminoaziridinating Agent, Eur. J. Org. Chem., 2009: 3635-3642.
Korean Notice of Allowance dated Feb. 23, 2015 for the priority Korean Patent Application No. 10-2011-0144955.
Akihiko Uchiyama, et al. "Control of Birefringence Dispersion of Uniaxially Oriented Poly(2,6-dimethyl 1,4-phenylene oxide)/Atactic Polystyrene Blend Films by Changing the Stretching Parameters"., Jpn. J. Appl. Phys, vol. 42 (2003), 5665-5669.
Aziz Gozgen, et al., "ROMP-NMP-ATRP Combination for the Preparation of 3-Miktoarm Star Terpolymer via Click Chemistry", Journal of Polymer Science: Part A: Polymer Chemistry, vol. 47, 497-504 (2009).
Eda Gungor, et al., "One-Pot Double Click Reactions for the Preparation of H-Shaped ABCDE-Type Quintopolymer", Journal of Polymer Science: Part A: Polymer Chemistry, vol. 47, 3409-3418 (2009).
Hakan Durmaz, et al. "Heteroarm H-Shaped Terpolymers through the Combination of the Diels-Alder Reaction and Controlled/Living Radical Polymerization Techniques", Journal of Polymer Science: Part A: Polymer Chemistry, vol. 44, 3947-3957 (2006).
Hakan Durmaz, et al., "Cyclic Homo and Block Copolymers Through Sequential Double Click Reactions", Journal of Polymer Science: Part A: Polymer Chemistry, vol. 48, 5083-5091 (2010).
Hakan Durmaz, et al., "Graft Copolymers via ROMP and Diels-Alder Click Reaction Strategy", Journal of Polymer Science: Part A: Polymer Chemistry, vol. 48, 5982-5991 (2010).

Hakan Durmaz, et al., "Linear Tetrablock Quaterpolymers via Triple Click Reactions, Azide-Alkyne, Diels-Alder, and Nitroxide Radical Coupling in a One-Pot Fashion", Journal of Polymer Science Part A: Polymer Chemistry, vol. 49, 1962-1968 (2011).

Hakan Durmaz, et al., "One-Pot Synthesis of Star-Block Copoymers Using Double Click Reactions", Journal of Polymer Science: Part A: Polymer Chemistry, vol. 46, 7091-7100 (2008).

Jun Yoo, et al., "Synthesis of complex architectures of comb block copolymers", Polymer 52 (2011) pp. 2499-2504.

M. Brett Runge, et al., "Synthesis of Comb Tri- and Tetrablock Copolymers Catalyzed by the Grubbs First Generation Catalyst", Macromol. Rapid Commun. 2009, 30, 1392-1398.

M. Brett Runge, et al., "Synthesis, Characterization, and Self-Assembly of Large Comb Block Copoymers", Polymer Preprints 2007, 48(1), 266-267.

\* cited by examiner

*Primary Examiner* — Ling Choi
*Assistant Examiner* — Catherine S Branch
(74) *Attorney, Agent, or Firm* — Cantor Colburn LLP

(57) ABSTRACT

An optical film including a polymer including a repeating unit A including a repeating unit represented by the following Chemical Formulas 1 to 3, or a combination thereof; and a repeating unit B derived from a monomer having an unsaturated bond copolymerizable with the repeating unit A, wherein the optical film has a short wavelength dispersion of an in-plane phase-difference value ($R_e$) (450 nm/550 nm) ranging from about 0.81 to about 1.20, and a long wavelength dispersion of an in-plane phase-difference value ($R_e$) (650 nm/550 nm) ranging from about 0.90 to about 1.18:

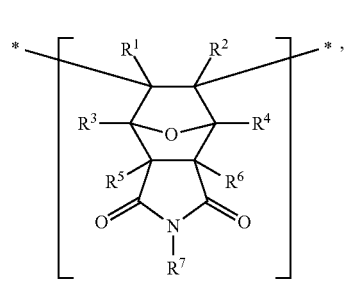

Chemical Formula 1

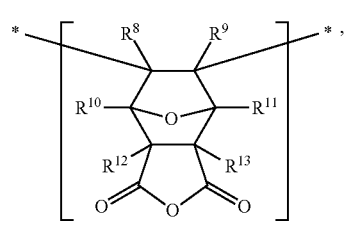

Chemical Formula 2

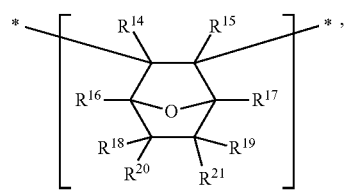

Chemical Formula 3 wherein, in Chemical Formulas 1 to 3, the variables $R^1$ to $R^{21}$ are defined herein.

17 Claims, 1 Drawing Sheet

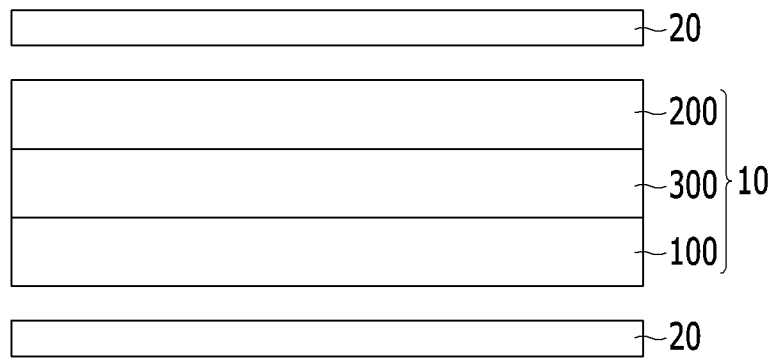

OPTICAL FILM AND DISPLAY DEVICE INCLUDING SAME

CROSS-REFERENCE TO RELATED APPLICATION

This application claims priority to Korean Patent Application No. 10-2011-0144955, filed on Dec. 28, 2011, and all the benefits accruing therefrom under 35 U.S.C. §119, the entire content of which is incorporated herein by reference.

BACKGROUND

1. Field

This disclosure relates to an optical film and a display device including the same.

2. Description of the Related Art

A reverse wavelength dispersion phase-difference compensation film has been used to compensate a phase difference and improve wide viewing angle and a color shift in a display such as a liquid crystal display ("LCD"), an organic light emitting diode ("OLED") device, and the like. However, the display device such as a liquid crystal display, an organic light emitting diode device, and the like is fabricated using a method including a high temperature process. Accordingly, development of a material having excellent heat resistance, for use in an optical film, including a reverse wavelength dispersion phase-difference compensation film, is desired.

SUMMARY

An embodiment provides an optical film having negative birefringence and excellent or improved heat resistance, and moisture resistance.

Another embodiment provides an optical film having reverse wavelength dispersibility and excellent or improved heat resistance and moisture resistance.

Yet another embodiment provides a display device including the optical film.

According to an embodiment, provided is an optical film that includes a polymer including a repeating unit A including a repeating units represented by the following Chemical Formulas 1 to 3 or a combination thereof; and a repeating unit B derived from a monomer having an unsaturated bond copolymerizable with the repeating unit A, wherein the optical film has a short wavelength dispersion of an in-plane phase-difference value ($R_e$) (450 nanometers (nm)/550 nm) ranges from about 0.81 to about 1.20, and a long wavelength dispersion of the in-plane phase-difference value ($R_e$) (650 nm/550 nm) ranges from about 0.90 to about 1.18.

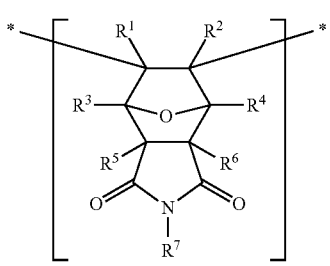

Chemical Formula 1

In Chemical Formula 1, $R^1$ to $R^6$ are the same or different in each repeating unit and are each independently hydrogen or a substituted or unsubstituted C1 to C10 aliphatic group, and $R^7$ is the same or different in each repeating unit, and each is independently hydrogen, a substituted or unsubstituted C1 to C30 aliphatic group, a substituted or unsubstituted C3 to C30 alicyclic group, a substituted or unsubstituted C6 to C30 aromatic group, or a substituted or unsubstituted C2 to C30 heterocyclic group, wherein the alicyclic group, aromatic group, or heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

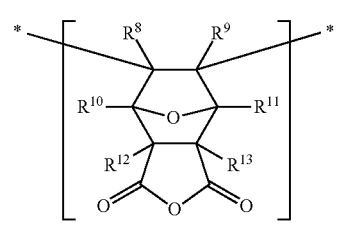

Chemical Formula 2

In Chemical Formula 2, $R^8$ to $R^{13}$ are the same or different in each repeating unit and are each independently hydrogen, or a substituted or unsubstituted C1 to C10 aliphatic group.

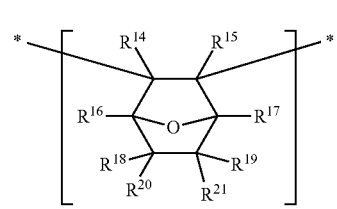

Chemical Formula 3

In Chemical Formula 3, $R^{14}$ to $R^{19}$ are the same or different in each repeating unit and are each independently hydrogen, or a substituted or unsubstituted C1 to C10 aliphatic group, and $R^{20}$ and $R^{21}$ are the same or different in each repeating unit and are each independently hydrogen, a substituted or unsubstituted C1 to C30 aliphatic group, a substituted or unsubstituted C3 to C30 alicyclic group, a substituted or unsubstituted C6 to C30 aromatic group, or a substituted or unsubstituted C2 to C30 heterocyclic group, wherein the alicyclic group, aromatic group, or heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In an embodiment, the repeating unit represented by the Chemical Formula 1 may include a repeating unit represented by the following Chemical Formulas 11-1 to 11-3, or a combination thereof.

Chemical Formula 11-1

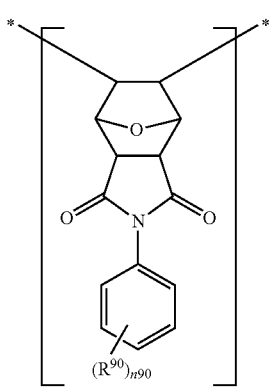

Chemical Formula 21-1

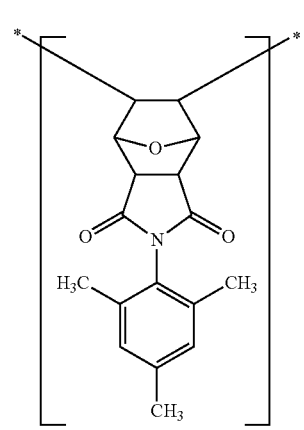

Chemical Formula 11-2

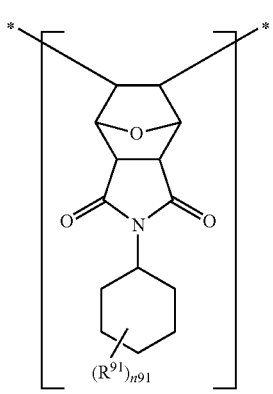

Chemical Formula 21-2

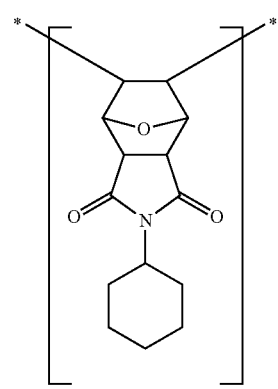

Chemical Formula 11-3

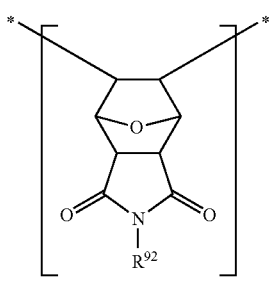

Chemical Formula 21-3

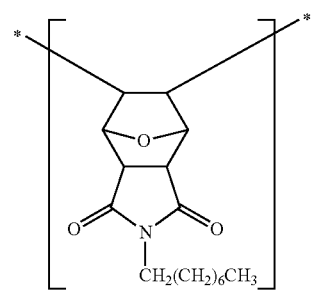

In Chemical Formulas 11-1 to 11-3, $R^{90}$ to $R^{92}$ are the same or different in each repeating unit and are each independently hydrogen, or a C1 to C20 alkyl group, n90 is the same or different in each repeating unit, and each is independently an integer ranging from 0 to 5, and n91 is the same or different in each repeating unit, and each is independently an integer ranging from 0 to 11.

In another embodiment, the repeating unit represented by the Chemical Formula 1 may include a repeating unit represented by the following Chemical Formulas 21-1 to 21-3, or a combination thereof, the repeating unit represented by the Chemical Formula 2 may include a repeating unit represented by the following Chemical Formula 22-1, and the repeating unit represented by the Chemical Formula 3 may include a repeating unit represented by the following Chemical Formula 23-1, a repeating unit represented by the following Chemical Formula 23-2, or a combination thereof.

Chemical Formula 22-1

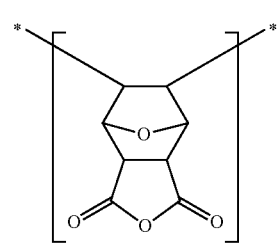

Formula 23-1

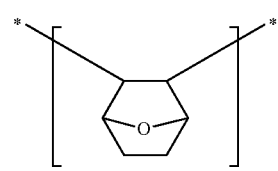

-continued

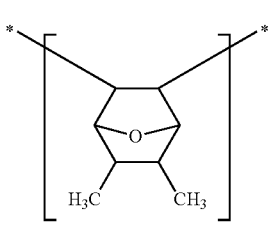

Chemical Formula 23-2

The repeating unit B may include a repeating unit represented by the following Chemical Formula 4, a repeating unit represented by the following Chemical Formula 5, or a combination thereof.

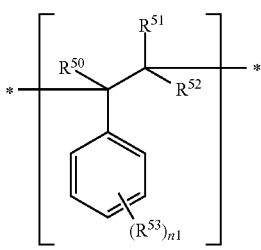

Chemical Formula 4

In Chemical Formula 4,
$R^{50}$ to $R^{52}$ are the same or different in each repeating unit and are each independently hydrogen, or a substituted or unsubstituted C1 to C10 aliphatic group, and
$R^{53}$ is the same or different in each repeating unit, and each is independently hydrogen, a halogen, a substituted or unsubstituted C1 to C30 aliphatic group, a substituted or unsubstituted C3 to C30 alicyclic group, a substituted or unsubstituted C6 to C30 aromatic group, a substituted or unsubstituted C2 to C30 heterocyclic group, a substituted or unsubstituted C1 to C30 alkoxy group, a substituted or unsubstituted C6 to C30 an aryloxy group, a substituted or unsubstituted C2 to C30 ester group, a carboxyl group, or —N($R^{100}$)($R^{101}$), (wherein $R^{100}$ and $R^{101}$ are the same or different and are each independently hydrogen, or a substituted or unsubstituted C1 to C10 aliphatic group), wherein the alicyclic group, aromatic group, or heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—, and
n1 is the same or different in each repeating unit, and each is independently an integer ranging from 0 to 5.

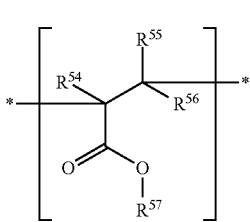

Chemical Formula 5

In Chemical Formula 5,
$R^{54}$ is the same or different in each repeating unit and each is independently hydrogen, or a methyl group,
$R^{55}$ and $R^{56}$ are the same or different in each repeating unit and are each independently hydrogen, or a substituted or unsubstituted C1 to C10 aliphatic group, and
$R^{57}$ is the same or different in each repeating unit, and each is independently a substituted or unsubstituted C1 to C30 aliphatic group, a substituted or unsubstituted C3 to C30 alicyclic group, a substituted or unsubstituted C6 to C30 aromatic group, or a substituted or unsubstituted C2 to C30 heterocyclic group, wherein the alicyclic group, aromatic group, or heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In an embodiment, the repeating unit represented by the Chemical Formula 4 may include a repeating unit represented by the following Chemical Formula 24-1, a repeating unit represented by the following Chemical Formula 24-2, or a combination thereof, and the repeating unit represented by the Chemical Formula 5 may include a repeating unit represented by the following Chemical Formula 25-1, a repeating unit represented by the following Chemical Formula 25-2, or a combination thereof.

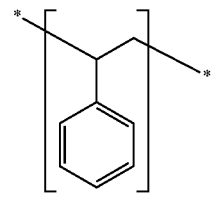

Chemical Formula 24-1

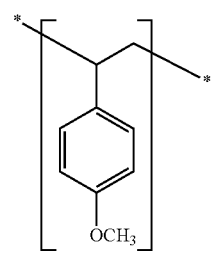

Chemical Formula 24-2

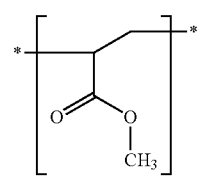

Chemical Formula 25-1

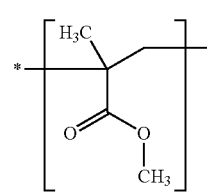

Chemical Formula 25-2

The repeating unit B may further include a repeating unit represented by the following Chemical Formula 8.

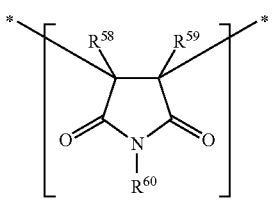

Chemical Formula 8

In Chemical Formula 8, $R^{58}$ and $R^{59}$ are the same or different in each repeating unit and are each independently hydrogen, or a substituted or unsubstituted C1 to C10 aliphatic group, and $R^{60}$ is the same or different in each repeating unit, and each is independently hydrogen, a substituted or unsubstituted C1 to C30 aliphatic group, a substituted or unsubstituted C3 to C30 alicyclic group, a substituted or unsubstituted C6 to C30 aromatic group, or a substituted or unsubstituted C2 to C30 heterocyclic group, wherein the alicyclic group, aromatic group, or heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

The polymer of the optical film may include the repeating unit A and the repeating unit B in a mole ratio of about 0.1:99.9 to about 50:50.

The optical film may have an in-phase phase-difference value ($R_e$) of about 0 nm to about 500 nm at a wavelength of about 550 nm, and a thickness direction phase-difference value ($R_{th}$) of about 0 nm to about −1000 nm at a wavelength of about 550 nm.

According to another embodiment, provided is an optical film that includes a polymer including a repeating unit C including a repeating unit represented by the Chemical Formulas 1 to 5, or a combination thereof; and a repeating unit D derived from a monomer having an unsaturated bond copolymerizable with the repeating unit C.

The repeating unit D may include a repeating unit represented by the following Chemical Formula 6, a repeating unit represented by the following Chemical Formula 7, or a combination thereof.

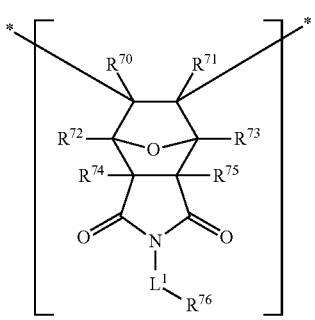

Chemical Formula 6

In Chemical Formula 6, $R^{70}$ to $R^{75}$ are the same or different in each repeating unit and are each independently hydrogen, or a substituted or unsubstituted C1 to C10 aliphatic group, $L^1$ is the same or different in each repeating unit and each is independently a substituted or unsubstituted C1 to C5 linear or branched alkylene group, —C(=O)NH—, —NHC(=O)—, —C(=O)O—, or —OC(=O)—, and $R^{76}$ is the same or different in each repeating unit, and each is independently a substituted or unsubstituted C3 to C30 alicyclic group, a substituted or unsubstituted C6 to C30 aromatic group, or a substituted or unsubstituted C2 to C30 heterocyclic group, wherein the alicyclic group, aromatic group, or heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤p≤10), —C(CH$_3$)$_2$—, —C(CF$_3$)$_2$—, or —C(=O)NH—.

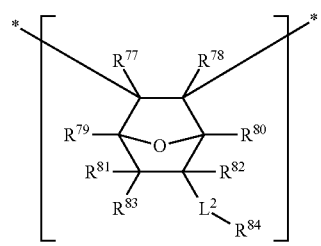

Chemical Formula 7

In Chemical Formula 7, $R^{77}$ to $R^{82}$ are the same or different in each repeating unit and are each independently hydrogen, or a substituted or unsubstituted C1 to C10 aliphatic group, and $R^{83}$ is the same or different in each repeating unit, and each is independently hydrogen, a substituted or unsubstituted C1 to C30 aliphatic group, a substituted or unsubstituted C3 to C30 alicyclic group, a substituted or unsubstituted C6 to C30 aromatic group, a substituted or unsubstituted C2 to C30 heterocyclic group, a carboxyl group, or a substituted or unsubstituted C2 to C30 ester group, wherein the alicyclic group, aromatic group, or heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—, $L^2$ is the same or different in each repeating unit and each is independently a substituted or unsubstituted C1 to C5 linear or branched alkylene group, —C(=O)NH—, —NHC(=O)—, —C(=O)O—, or —OC(=)—, and $R^{84}$ is the same or different in each repeating unit and each is independently a substituted or unsubstituted C3 to C30 alicyclic group, a substituted or unsubstituted C6 to C30 aromatic group, or a substituted or unsubstituted C2 to C30 heterocyclic group, wherein the alicyclic group, aromatic group, or heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

The repeating unit C may further include a repeating unit represented by the Chemical Formula 8.

The polymer of the optical film may include the repeating unit C and the repeating unit D in a mole ratio of about 1:2 to about 1:9.

The optical film may have a short wavelength dispersion of the in-plane phase-difference value ($R_e$) (450 nm/550 nm) of less than about 1 and a long wavelength dispersion of the in-plane phase-difference value ($R_e$) (650 nm/550 nm) of greater than about 1.

The polymer may have a number average molecular weight (Mn) of about 10,000 g/mol to about 200,000 g/mol, and a polydispersity index of about 1.0 to about 5.0.

The polymer may have a refractive index of about 1.40 to about 1.69.

The polymer may have a glass transition temperature ($T_g$) of about 80° C. to about 200° C.

The optical film may have an average light transmittance of greater than or equal to about 80% at a wavelength range of about 380 nm to about 780 nm, and a haze of less than or equal to about 3%.

The optical film may have a glass transition temperature of about 80° C. to about 200° C.

According to yet another embodiment, a display device including the optical film is provided.

BRIEF DESCRIPTION OF THE DRAWING

The above and other aspects, advantages and features of this disclosure will become more apparent by describing in further detail embodiments thereof with reference to the accompanying drawings.

FIG. 1 is a cross-sectional view showing a liquid crystal display ("LCD") according to an embodiment, as disclosed herein.

DETAILED DESCRIPTION

This disclosure will be described more fully hereinafter with reference to the accompanying drawings, in which various embodiments are shown. This disclosure may, however, be embodied in many different forms and should not be construed as limited to the exemplary embodiments set forth herein. Rather, these embodiments are provided so that this disclosure will be thorough and complete, and will fully convey the scope of the invention to those skilled in the art. Like reference numerals refer to like elements throughout.

In the drawings, the thickness of layers, films, panels, regions, etc., are not to scale for clarity.

It will be understood that when an element such as a layer, film, region, or substrate is referred to as being "on" or "disposed on" another element, it can be directly on the other element or intervening elements may also be present. In contrast, when an element is referred to as being "directly on" or "directly disposed on" another element, there are no intervening elements present.

The terminology used herein is for the purpose of describing particular embodiments only and is not intended to be limiting. As used herein, the singular forms "a," "an," and "the" are intended to include the plural forms as well, including "at least one," unless the content clearly indicates otherwise. "Or" means "and/or." It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning consistent with their meaning in the context of the relevant art and the present disclosure, and will not be interpreted in an idealized or overly formal sense unless expressly so defined herein.

As used herein, when a specific definition is not otherwise provided, the term "substituted" refers to a compound or group substituted with a substituent including a halogen (specifically the halogens —F, —Cl, —Br, or —I), a hydroxyl group, a nitro group, a cyano group, an amino group (—$NH_2$, —NH($R^{200}$) or —N($R^{201}$)($R^{202}$), wherein $R^{200}$, $R^{201}$, and $R^{202}$ are the same or different, and are each independently a C1 to C10 alkyl group), an amidino group, a hydrazino group, a hydrazono group, a carboxyl group (—C(=O)OH), an ester group, a ketone group, a substituted or unsubstituted C1 to C30 alkyl group, a substituted or unsubstituted C3 to C30 alicyclic group, a substituted or unsubstituted C6 to C30 aryl group, a substituted or unsubstituted C2 to C30 alkenyl group, a substituted or unsubstituted C2 to C30 alkynyl group, a substituted or unsubstituted C5 to C30 heteroaryl group, and a substituted or unsubstituted C2 to C30 heterocyclic group instead of a hydrogen of a functional group, or two or more of the forgoing substituents are linked to each other to provide a ring, provided that the substituted atom's normal valence is not exceeded.

As used herein, when a specific definition is not otherwise provided, the term "alkyl" group refers to a straight or branched chain saturated aliphatic hydrocarbon having the specified number of carbon atoms, for example a C1 to C30 alkyl group, and specifically a C1 to C15 alkyl group, and having a valence of at least one, optionally substituted with one or more substituents where indicated, provided that the valence of the alkyl group is not exceeded.

The term "cycloalkyl" group refers to a group that comprises one or more saturated and/or partially saturated rings in which all ring members are carbon, such as cyclopropyl, cyclobutyl, cyclopentyl, cyclohexyl, cycloheptyl, cyclooctyl, adamantyl and partially saturated variants of the foregoing, such as cycloalkenyl groups (e.g., cyclohexenyl) or cycloalkynyl groups, and having a valence of at least one, and optionally substituted with one or more substituents where indicated, provided that the valence of the alkyl group is not exceeded. Cycloalkyl groups do not include an aromatic ring or a heterocyclic ring. When the numbers of carbon atoms is specified, for example a C3 to C30 cycloalkyl group, and specifically a C3 to C18 cycloalkyl group, the number means the number of ring members present in the one or more rings.

The term "cycloalkenyl" group refers to a stable monovalent aliphatic monocyclic or polycyclic group having at least one carbon-carbon double bond, wherein all ring members are carbon. Non-limiting examples include cyclopentenyl and cyclohexenyl.

The term "cycloalkynyl" group refers to a stable aliphatic monocyclic or polycyclic group having at least one carbon-carbon triple bond, wherein all ring members are carbon. Non-limiting examples include cyclohexynyl.

The term "cycloalkylene" group refers to a divalent radical formed by the removal of two hydrogen atoms from one or more rings of a cycloalkyl group, as defined above.

The term "cycloalkenylene" group refers to a stable aliphatic 5-15-membered monocyclic or polycyclic, divalent radical having at least one carbon-carbon double bond, which comprises one or more rings connected or bridged together. Unless mentioned otherwise, the cycloalkenylene radical can be linked at any desired carbon atom provided that a stable structure is obtained. If the cycloalkenylene radical is substituted, this may be so at any desired carbon atom, once again provided that a stable structure is obtained. Non-limiting examples thereof include cyclopentenylene, cyclohexenylene, cycloheptenylene, cyclooctenylene, cyclononenylene, cyclodecenylene, norbornenylene, 2-methylcyclopentenylene, 2-methylcyclooctenylene, and the like.

The term "cycloalkynylene" group refers to a stable aliphatic 8- to 15-membered monocyclic or polycyclic divalent radical having at least one carbon-carbon triple bond and consisting solely of carbon and hydrogen atoms which may comprise one or more fused or bridged ring(s), preferably a 8- to 10-membered monocyclic or 12- to 15-membered bicyclic ring. Unless otherwise specified, the cycloalkynylene ring may be attached at any carbon atom which results in a stable structure and, if substituted, may be substituted at any suitable carbon atom which results in a stable structure. Non-limiting examples include cyclooctynylene, cyclononynylene, cyclodecynylene, 2-methylcyclooctynylene, and the like.

The term "alkoxy" group refers to an alkyl group as defined above, having the specified number of carbon atoms, for example a C1 to C30 alkoxy group, and specifically a C1 to C18 alkoxy group, linked via an oxygen, e.g. alkyl-O—.

The term "ester" group refers to a —C(=O)OR group, wherein R is an aliphatic group as defined below, having the specified number of carbon atoms, for example a C2 to C30 ester group, and specifically a C2 to C18 ester group, wherein the carbon of the carbonyl group is included in the specified number of carbon atoms.

The term "ketone" group refers to a —C(=O)R group, wherein R is an aliphatic group as defined below, having the specified number of carbon atoms, for example C2 to C30 ketone group, and specifically a C2 to C18 ketone group, wherein the carbon of the carbonyl group is included in the specified number of carbon atoms.

The term "aryl" group refers to a cyclic group in which all ring members are carbon and at least one ring is aromatic, the group having the specified number of carbon atoms, for example a C6 to C30 aryl group, and specifically a C6 to C18 aryl group, and having a valence of at least one, optionally substituted with one or more substituents where indicated, provided that the valence of the aryl group is not exceeded. More than one ring may be present, and any additional rings may be independently aromatic, saturated or partially unsaturated, and may be fused, pendant, spirocyclic, or a combination thereof.

The term "aryloxy" group refers to an aryl group as defined above, having the specified number of carbon atoms, for example a C6 to C30 aryloxy group, and specifically a C6 to C18 aryloxy group, linked via an oxygen, e.g. aryl-O—.

The term "alkenyl" group refers to a straight or branched chain hydrocarbon that comprises at least one carbon-carbon double bond, having the specified number of carbon atoms, for example a C2 to C30 alkenyl group, and specifically a C2 to C18 alkenyl group, and having a valence of at least one, optionally substituted with one or more substituents where indicated, provided that the valence of the alkenyl group is not exceeded.

The term "alkynyl" group refers to a straight or branched chain, monovalent hydrocarbon group having at least one carbon-carbon triple bond. Non-limiting examples include ethynyl.

The term "alkylene" group refers to a straight or branched chain, saturated, aliphatic hydrocarbon group having the specified number of carbon atoms, for example a C1 to C30 alkylene group, and specifically a C1 to C18 alkylene group, having a valence of at least two, optionally substituted with one or more substituents where indicated, provided that the valence of the alkyl group is not exceeded.

The term "alkenylene" group refers to a straight or branched chain hydrocarbon group having at least one carbon-carbon double bond and having a valence of at least two, optionally substituted with one or more substituents where indicated, provided that the valence of the alkenyl group is not exceeded.

The term "alkynylene" group refers to a straight or branched chain divalent aliphatic hydrocarbon that has one or more unsaturated carbon-carbon bonds, at least one of which is a triple bond. Non-limiting examples include ethynylene.

The term "arylene" group refers to a divalent radical formed by the removal of two hydrogen atoms from one or more rings of an aromatic hydrocarbon, wherein the hydrogen atoms may be removed from the same or different rings, each of which rings may be aromatic or nonaromatic, and having the specified number of carbon atoms, for example a C6 to C30 arylene group, and specifically a C6 to C16 arylene group.

The term "hydrocarbon" refers to an organic compound having at least one carbon atom and at least one hydrogen atom, optionally substituted with one or more substituents where indicated.

As used herein, when a specific definition is not otherwise provided, "aliphatic group" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, and specifically a C1 to C15 alkyl group, a C2 to C15 alkenyl group, a C2 to C15 alkynyl group, a C1 to C15 alkylene group, a C2 to C15 alkenylene group, or C2 to C15 alkynylene group.

The term "alicyclic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or C3 to C30 cycloalkynylene group, and specifically a C3 to C15 cycloalkyl group, a C3 to C15 cycloalkenyl group, a C3 to C15 cycloalkynyl group, a C3 to C15 cycloalkylene group, a C3 to C15 cycloalkenylene group, or C3 to C15 cycloalkynylene group.

The term "aromatic group" refers to a C6 to C30 aryl group or C6 to C30 arylene group, and specifically a C6 to C16 aryl group or C6 to C16 arylene group.

The term "heterocyclic group" refers to a C2 to C30 heterocycloalkyl group, a C2 to C30 heterocycloalkylene group, a C2 to C30 heterocycloalkenyl group, a C2 to C30 heterocycloalkenylene group, a C2 to C30 heterocycloalkynyl group, a C2 to C30 heterocycloalkynylene group, a C2 to C30 heteroaryl group, or C2 to C30 heteroarylene group that include 1 to 3 heteroatoms selected from O, S, N, P, Si, and a combination thereof in one ring, and specifically a C2 to C15 heterocycloalkyl group, a C2 to C15 heterocycloalkylene group, a C2 to C15 heterocycloalkenyl group, a C2 to C15 heterocycloalkenylene group, a C2 to C15 heterocycloalkynyl group, a C2 to C15 heterocycloalkynylene group, a C2 to C15 heteroaryl group, or a C2 to C15 heteroarylene group, wherein the foregoing heterocyclic groups each include 1 to 3 heteroatoms selected from O, S, N, P, Si, and a combination thereof in one ring. Other heteroatoms may also be present.

The term "condensed cyclic group" refers to a group having two or more rings, wherein at least two of the rings are fused, i.e., share at least two carbon atoms. Non-limiting examples include a C6 to C30 cycloalkane, a C5 to C30 heterocycloalkane, or naphthalene.

As used herein, when a definition is not otherwise provided, the term "combining" is inclusive of mixing and copolymerizing, and the term "combination" includes a mixture, a copolymer, a stacked structure, a composite, an alloy, a blend, a reaction product or the like.

The term "combination thereof" refers to a combination comprising at least one of the named constituents, components, compounds, or elements, optionally together with one or more of the same class of constituents, components, compounds, or elements not named.

The term "copolymerization" includes random copolymerization, block copolymerization, or graft copolymerization, and the like, and the terms "polymer" and "copolymer" include a random copolymer, block copolymer, or graft copolymer, and the like.

In addition, in the specification, the mark "*" refers to a point of attachment to a repeating unit.

The term "(meth)acrylate" refers to an acrylate group ($H_2C=CH-C(=O)O-$) and a methacrylate group ($H_2C=C(CH_3)-C(=O)-$), and (meth)acryloxy refers to an acryloxy group and a methacryloxy group.

The optical film according to an embodiment includes, a polymer including, a repeating unit A including a repeating unit represented by the following Chemical Formulas 1 to 3, or a combination thereof; and a repeating unit B derived from a monomer having an unsaturated bond copolymerizable with the repeating unit A, wherein the optical film has a short wavelength dispersion of an in-plane phase-difference value ($R_e$) (450 nanometers/550 nanometers) ranging from about 0.81 to about 1.20, and a long wavelength dispersion of an in-plane phase-difference value ($R_e$) (650 nanometers/550 nanometers) ranging from about 0.90 to about 1.18.

In an embodiment, the polymer may be a random copolymer, but is not limited thereto. In addition, the polymer may include two or more of the same or different repeating units, two to about eight of the same or different repeating units in an embodiment, two to about five of the same or different repeating units in another embodiment, two to four of the same or different repeating units in yet another embodiment, and two to three of the same or different repeating units in still another embodiment. The repeating units may differ in structure (kind) or in substitution.

stituted C1 to C10 aliphatic group, and in an embodiment, $R^1$ to $R^6$ are each independently hydrogen, or a substituted or unsubstituted C1 to C5 aliphatic group, and in another embodiment, $R^1$ to $R^6$ are each hydrogen.

$R^7$ in Chemical Formula 1 is the same or different in each repeating unit, and each is independently hydrogen, a substituted or unsubstituted C1 to C30 aliphatic group, a substituted or unsubstituted C3 to C30 alicyclic group, a substituted or unsubstituted C6 to C30 aromatic group, or a substituted or unsubstituted C2 to C30 heterocyclic group, wherein the alicyclic group, aromatic group, or heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In an embodiment, $R^7$ in Chemical Formula 1 is the same or different in each repeating unit, and each is independently a substituted or unsubstituted C1 to C20 aliphatic group, a substituted or unsubstituted C3 to C20 alicyclic group, a substituted or unsubstituted C6 to C20 aromatic group, or a substituted or unsubstituted C2 to C20 heterocyclic group, and in another embodiment, $R^7$ in Chemical Formula 1 is the same or different in each repeating unit, and each is independently a substituted or unsubstituted C1 to C10 alkyl group, a substituted or unsubstituted C3 to C10 cycloalkyl group, a substituted or unsubstituted C6 to C15 aromatic group, or a substituted or unsubstituted C2 to C15 heterocyclic group, wherein, the alicyclic group, the aromatic group or the heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

Chemical Formula 1

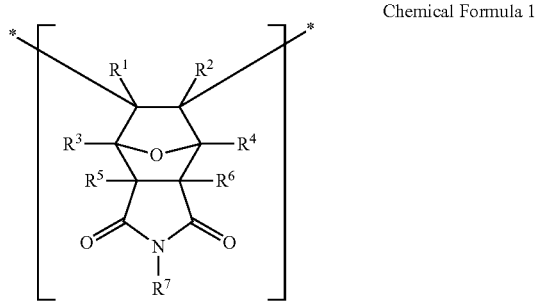

In Chemical Formula 1, $R^1$ to $R^6$ are the same or different in each repeating unit and are each independently hydrogen, or a substituted or unsub- Chemical Formula 2

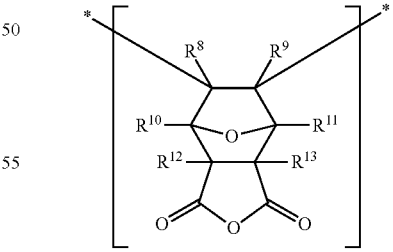

In Chemical Formula 2, $R^8$ to $R^{13}$ are the same or different in each repeating unit and are each independently hydrogen, or a substituted or unsubstituted C1 to C10 aliphatic group, and in an embodiment, $R^8$ to $R^{13}$ are each independently hydrogen, or a substituted or unsubstituted C1 to C5 aliphatic group, and in another embodiment, $R^8$ to $R^{13}$ are each hydrogen.

Chemical Formula 3

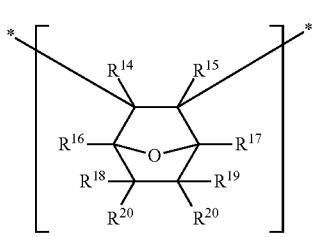

In Chemical Formula 3, $R^{14}$ to $R^{19}$ are the same or different in each repeating unit and are each independently hydrogen, or a substituted or unsubstituted C1 to C10 aliphatic group, and in an embodiment, $R^{14}$ to $R^{19}$ are each independently hydrogen, or a substituted or unsubstituted C1 to C5 aliphatic group, and in another embodiment, $R^{14}$ to $R^{19}$ are each hydrogen.

$R^{20}$ and $R^{21}$ in Chemical Formula 3 are the same or different in each repeating unit and are each independently hydrogen, a substituted or unsubstituted C1 to C30 aliphatic group, a substituted or unsubstituted C3 to C30 alicyclic group, a substituted or unsubstituted C6 to C30 aromatic group, or a substituted or unsubstituted C2 to C30 heterocyclic group, wherein the alicyclic group, aromatic group, or heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In an embodiment, $R^{20}$ and $R^{21}$ in Chemical Formula 3 are the same or different in each repeating unit and are each independently hydrogen, a substituted or unsubstituted C1 to C20 aliphatic group, a substituted or unsubstituted C3 to C20 alicyclic group, a substituted or unsubstituted C6 to C20 aromatic group, or a substituted or unsubstituted C2 to C20 heterocyclic group, and in another embodiment, $R^{20}$ and $R^{21}$ in Chemical Formula 3 are the same or different in each repeating unit and are each independently hydrogen, a substituted or unsubstituted C1 to C10 alkyl group, a substituted or unsubstituted C3 to C10 cycloalkyl group, a substituted or unsubstituted C6 to C15 aromatic group, or a substituted or unsubstituted C2 to C15 heterocyclic group, wherein, the alicyclic group, the aromatic group or the heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In an embodiment, the repeating unit represented by the Chemical Formula 1 may include a repeating unit represented by the following Chemical Formulas 11-1 to 11-3, or a combination thereof, but is not limited thereto.

Chemical Formula 11-1

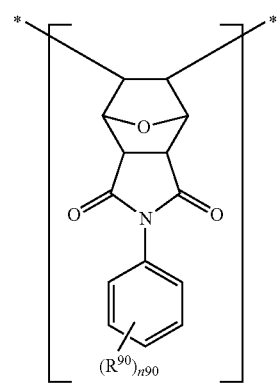

Chemical Formula 11-2

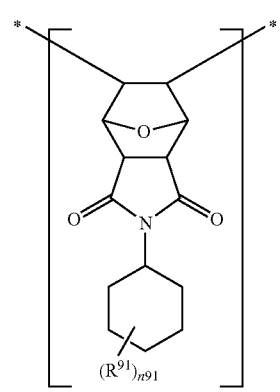

Chemical Formula 11-3

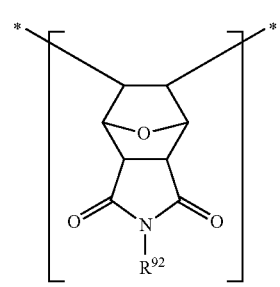

In Chemical Formulas 11-1 to 11-3, $R^{90}$ to $R^{92}$ are the same or different in each repeating unit and are each independently hydrogen, or a C1 to C20 alkyl group, and in an embodiment, $R^{90}$ to $R^{92}$ are each independently hydrogen, or a C1 to C10 alkyl group, n90 is the same or different in each repeating unit, and each is independently an integer ranging from 0 to 5, and n91 is the same or different in each repeating unit, and each is independently an integer ranging from 0 to 11.

In another embodiment, the repeating unit represented by the Chemical Formula 1 may include a repeating unit represented by the following Chemical Formulas 21-1 to 21-3, or a combination thereof, the repeating unit represented by the Chemical Formula 2 may include a repeating unit represented by the following Chemical Formula 22-1, and the repeating unit represented by the Chemical Formula 3 may include a repeating unit represented by the following Chemical Formula 23-1, a repeating unit represented by the following Chemical Formula 23-2, or a combination thereof, but they are not limited thereto.

Chemical Formula 21-1

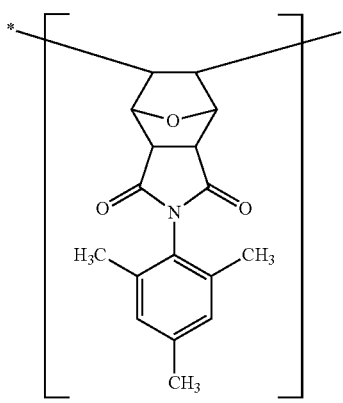

Chemical Formula 21-2

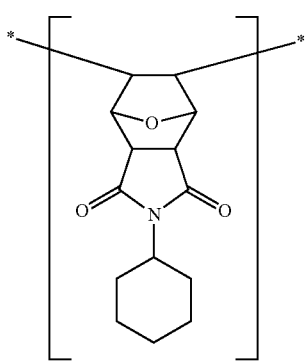

Chemical Formula 21-3

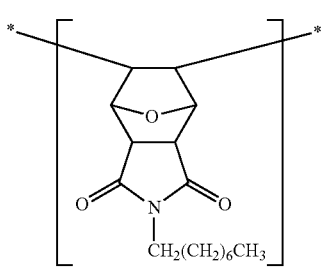

Chemical Formula 22-1

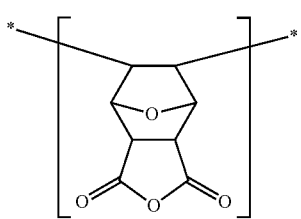

Chemical Formula 23-1

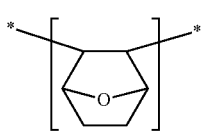

Chemical Formula 23-2

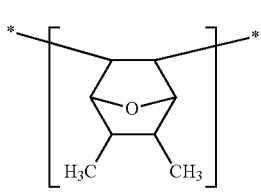

The repeating unit A has excellent or improved heat resistance and thus, while not wishing to be bound by theory, it is believed the repeating unit A may improve heat resistance and moisture resistance of a polymer including the repeating unit A and an optical film including the polymer.

In addition, the repeating unit A is derived from a monomer including an oxy group (—O—) and polymerization of the monomer may be easily initiated by a free radical initiator, including an azo-containing initiator or a peroxide-containing initiator, preparing repeating unit A without the use of a metal catalyst, and thus the repeating unit A may have excellent or improved processibility and economic feasibility.

The repeating unit B is derived from a monomer comprising an unsaturated bond copolymerizable with the repeating unit A. In an embodiment, the monomer may further contain a substituted or unsubstituted C6-C30 aromatic group or a substituted or unsubstituted C2-C30 ester group. For example, the repeating unit B may include a repeating unit represented by the following Chemical Formula 4, a repeating unit represented by the following Chemical Formula 5, or a combination thereof.

Chemical Formula 4

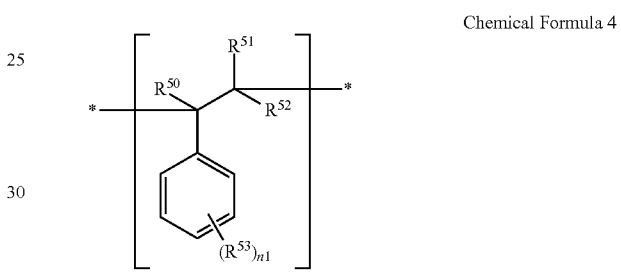

In Chemical Formula 4, $R^{50}$ to $R^{52}$ are the same or different in each repeating unit and are each independently hydrogen, or a substituted or unsubstituted C1 to C10 aliphatic group, and in an embodiment, $R^{50}$ to $R^{52}$ are each independently hydrogen, or a substituted or unsubstituted C1 to C5 aliphatic group, and in another embodiment, $R^{50}$ to $R^{52}$ are each hydrogen.

$R^{53}$ in Chemical Formula 4 is the same or different in each repeating unit, and each is independently hydrogen, a halogen, a substituted or unsubstituted C1 to C30 aliphatic group, a substituted or unsubstituted C3 to C30 alicyclic group, a substituted or unsubstituted C6 to C30 aromatic group, a substituted or unsubstituted C2 to C30 heterocyclic group, a substituted or unsubstituted C1 to C30 alkoxy group, a substituted or unsubstituted C6 to C30 an aryloxy group, a substituted or unsubstituted C2 to C30 ester group, a carboxyl group, or —N($R^{100}$)($R^{101}$), (wherein $R^{100}$ and $R^{101}$ are the same or different and are each independently hydrogen, or a substituted or unsubstituted C1 to C10 aliphatic group), wherein the alicyclic group, aromatic group, or heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In an embodiment, $R^{53}$ in Chemical Formula 4 is the same or different in each repeating unit, and each is independently hydrogen, a halogen, a substituted or unsubstituted C1 to C20 aliphatic group, a substituted or unsubstituted C3 to C20 alicyclic group, a substituted or unsubstituted C6 to C20 aromatic group, a substituted or unsubstituted C2 to C20 heterocyclic group, a substituted or unsubstituted C1 to C20 alkoxy group, a substituted or unsubstituted C6 to C20 aryloxy group, a substituted or unsubstituted C2 to C20 ester group, a carboxyl group, or —N ($R^{100}$)($R^{101}$), (wherein, $R^{100}$ and $R^{101}$ are the same or different and are each independently hydrogen, or a substituted or unsubstituted C1 to C10 aliphatic group), and in another embodiment, $R^{53}$ in Chemical Formula 4 is the same or different in each repeating unit, and each is independently hydrogen, a halogen, a substituted or unsubstituted C1 to C10 alkyl group, a substituted or unsubstituted C3 to C10 cycloalkyl group, a substituted or unsubstituted C6 to C15 aromatic group, a substituted or unsubstituted C2 to C15 heterocyclic group, a substituted or unsubstituted C1 to C10 alkoxy group, a substituted or unsubstituted C6 to C15 aryloxy group, a substituted or unsubstituted C2 to C10 ester group, a carboxyl group, or —N($R^{100}$)($R^{101}$), (wherein, $R^{100}$ and $R^{101}$ are the same or different and are each independently hydrogen, or a substituted or unsubstituted C1 to C10 aliphatic group), wherein, the alicyclic group, the aromatic group, or the heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

n1 in Chemical Formula 4 is the same or different in each repeating unit, and each is independently an integer ranging from 0 to 5.

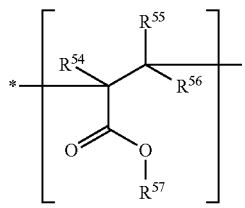

Chemical Formula 5

In Chemical Formula 5, $R^{54}$ is the same or different in each repeating unit and is independently hydrogen, or a methyl group.

$R^{55}$ and $R^{56}$ in Chemical Formula 5 are the same or different in each repeating unit and are each independently hydrogen, or a substituted or unsubstituted C1 to C10 aliphatic group, and in an embodiment, $R^{55}$ and $R^{56}$ are each independently hydrogen, or a substituted or unsubstituted C1 to C5 aliphatic group, and in another embodiment, $R^{55}$ and $R^{56}$ are each hydrogen.

$R^{57}$ in Chemical Formula 5 is the same or different in each repeating unit, and each is independently a substituted or unsubstituted C1 to C30 aliphatic group, a substituted or unsubstituted C3 to C30 alicyclic group, a substituted or unsubstituted C6 to C30 aromatic group, or a substituted or unsubstituted C2 to C30 heterocyclic group, wherein the alicyclic group, aromatic group, or heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In an embodiment, $R^{57}$ in Chemical Formula 5 is the same or different in each repeating unit, and each is independently a substituted or unsubstituted C1 to C20 aliphatic group, a substituted or unsubstituted C3 to C20 alicyclic group, a substituted or unsubstituted C6 to C20 aromatic group, or a substituted or unsubstituted C2 to C20 heterocyclic group, and in another embodiment, $R^{57}$ in Chemical Formula 5 is the same or different in each repeating unit, and each is independently a substituted or unsubstituted C1 to C10 alkyl group, a substituted or unsubstituted C3 to C10 cycloalkyl group, a substituted or unsubstituted C6 to C15 aromatic group, or a substituted or unsubstituted C2 to C15 heterocyclic group, wherein, the alicyclic group, the aromatic group or the heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In another embodiment, the repeating unit represented by Chemical Formula 4 may include a repeating unit represented by the following Chemical Formula 24-1, a repeating unit represented by the following Chemical Formula 24-2, or a combination thereof, and the repeating unit represented by the Chemical Formula 5 may include a repeating unit represented by the following Chemical Formula 25-1, a repeating unit represented by the following Chemical Formula 25-2, or a combination thereof, but they are not limited thereto.

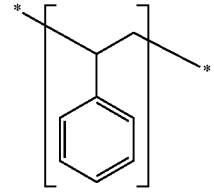

Chemical Formula 24-1

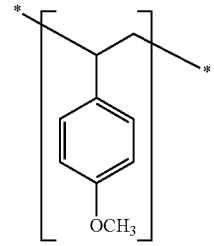

Chemical Formula 24-2

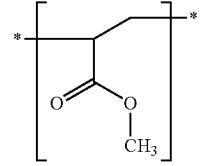

Chemical Formula 25-1

-continued

Chemical Formula 25-2

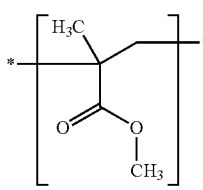

The repeating unit B has excellent or improved negative birefringence and moisture resistance and thus, while not wishing to be bound by theory, it is believed the repeating unit B may improve negative birefringence and moisture resistance of a polymer including the repeating unit B and an optical film including the polymer.

In addition, since polymerization of the monomer for deriving the repeating unit B may be easily initiated by a free radical initiator, including an azo-containing initiator or a peroxide-containing initiator, the repeating unit B may be prepared without the use of a metal catalyst, and thus may have excellent or improved processibility and economic feasibility.

Accordingly, when the repeating units A and B are present in a polymer, the polymer and an optical film including the polymer may have excellent or improved heat resistance and moisture resistance, as well as excellent or improved negative birefringence.

The repeating unit B, in addition to being derived from a monomer represented by Chemical Formula 4 a monomer represented by Chemical Formula 5, or a combination thereof, may further include a repeating unit represented by the following Chemical Formula 8.

Chemical Formula 8

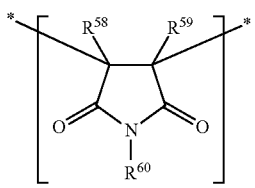

In Chemical Formula 8, $R^{58}$ and $R^{59}$ are the same or different in each repeating unit and are each independently hydrogen, or a substituted or unsubstituted C1 to C10 aliphatic group, and in an embodiment, $R^{58}$ and $R^{59}$ are each independently hydrogen, or a substituted or unsubstituted C1 to C5 aliphatic group, and in another embodiment, $R^{58}$ and $R^{59}$ are each hydrogen.

$R^{60}$ in Chemical Formula 8 is the same or different in each repeating unit, and each is independently hydrogen, a substituted or unsubstituted C1 to C30 aliphatic group, a substituted or unsubstituted C3 to C30 alicyclic group, a substituted or unsubstituted C6 to C30 aromatic group, or a substituted or unsubstituted C2 to C30 heterocyclic group, wherein the alicyclic group, aromatic group, or heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In an embodiment, $R^{60}$ in Chemical Formula 8 is the same or different in each repeating unit, and each is independently hydrogen, a substituted or unsubstituted C1 to C20 aliphatic group, a substituted or unsubstituted C3 to C20 alicyclic group, a substituted or unsubstituted C6 to C20 aromatic group, or a substituted or unsubstituted C2 to C20 heterocyclic group, and in another embodiment, $R^{60}$ in Chemical Formula 8 is the same or different in each repeating unit, and each is independently is hydrogen, a substituted or unsubstituted C1 to C10 alkyl group, a substituted or unsubstituted C3 to 010 cycloalkyl group, a substituted or unsubstituted C6 to C15 aromatic group, or a substituted or unsubstituted C2 to C15 heterocyclic group, wherein, the alicyclic group, the aromatic group or the heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In an embodiment, the repeating unit represented by Chemical Formula 8 may include a repeating unit represented by the Chemical Formula 18-1, a repeating unit represented by the Chemical Formula 18-2, or a combination thereof, but is not limited thereto.

Chemical Formula 18-1

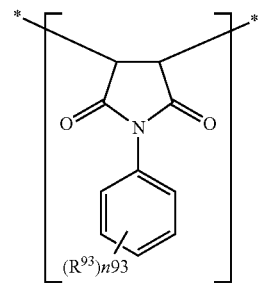

Chemical Formula 18-2

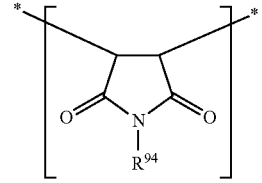

In Chemical Formulas 18-1 and 18-2, $R^{93}$ and $R^{94}$ are the same or different in each repeating unit and are each independently hydrogen, or a C1 to C20 alkyl group, and in an embodiment, $R^{93}$ and $R^{94}$ are each independently hydrogen, or a C1 to C10 alkyl group.

n93 in Chemical Formula 18-1 is the same or different in each repeating unit, and each is independently an integer ranging from 0 to 5.

In another embodiment, the repeating unit represented by Chemical Formula 8 may include a repeating unit represented by the following Chemical Formulas 28-1 to 28-3, or a combination thereof, but is not limited thereto.

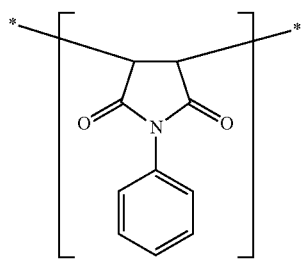

Chemical Formula 28-1

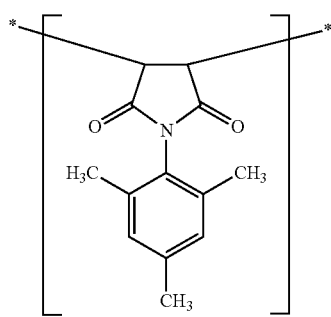

Chemical Formula 28-2

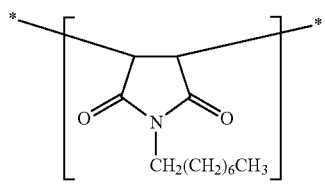

Chemical Formula 28-3

While not wishing to be bound by theory, it is believed when the repeating unit B additionally includes a repeating unit represented by the above Chemical Formula 8, an imide cyclic group included therein may widen a heat resistance adjustment range of a polymer. This cyclic structure included in a polymer main chain of the polymer may also improve mechanical strength, for example, hardness of an optical film.

Other types of the repeating units B may be used instead of or in addition to the repeating unit represented by Chemical Formula 4, the repeating unit represented by Chemical Formula 5, the optional repeating unit represented by Chemical Formula 8 or a combination thereof, provided that the other units may be derived from a monomer comprising an unsaturated bond copolymerizable with the repeating unit A, and the desired properties of the polymer are not significantly adversely affected, for example heat resistance, moisture resistance, and negative birefringence, and provided that the polymer can be processed to form an optical film and is suitable for use in an intended device, for example a display device. Other types of monomers comprising an unsaturated bond copolymerizable with the repeating unit A include a substituted or unsubstituted vinyl ester monomer, a substituted or unsubstituted vinyl ether monomer, a substituted or unsubstituted allyl ether monomer, a substituted or unsubstituted allyl ester monomer, a substituted or unsubstituted itaconimide monomer, and the like. Such monomers may include other polymer repeating units, (e.g., amide units, carbonate units, ester units, ether units, imide units, siloxane units, silane units, and the like, as well as combinations thereof), for example a urethane di(meth)acrylate. In an embodiment, no repeating units other than the repeating unit represented by Chemical Formulas 1 to 3, and the repeating units represented by Chemical Formula 4, Chemical Formula 5, Chemical Formula 8, or a combination thereof, is present in the polymer.

In the optical film, the polymer may include the repeating unit A and the repeating unit B in a mole ratio of about 0.1:99.9 to about 50:50. When the repeating units A and B are included within the foregoing range, negative birefringence of the polymer may be effectively improved and thus while not wishing to be bound by theory, it is believed heat resistance and moisture resistance may also be improved. In an embodiment, the polymer may include the repeating unit A and the repeating unit B in a mole ratio of about 1:99 to 30:70, and specifically about 5:95 to about 20:80. If repeating units other than the repeating unit B are present, such units are present in an amount ranging from about 0.1 to about 10 mole percent, or about 0.1 to about 5 mole percent, based on the total moles of units in the polymer.

For example, the repeating unit A may include the repeating unit represented by the Chemical Formula 1 and the repeating unit represented by the Chemical Formula 2, wherein, the polymer may include about 0.1 mole percent (mol %) to about 50 mol % of the repeating unit represented by the Chemical Formula 1, about 0.1 mol % to about 30 mol % of the repeating unit represented by the Chemical Formula 2, and about 49.9 mol % to about 99.8 mol % of the repeating unit B, based on 100 mol % of the total amount of the repeating units of the polymer. Specifically, the polymer may include about 0.1 mol % to about 20 mol % of the repeating unit represented by the Chemical Formula 1, about 0.1 mol % to about 20 mol % of the repeating unit represented by the Chemical Formula 2, and about 70 mol % to about 90 mol % of the repeating unit B based on 100 mol % of the total amount of the repeating units. More specifically, the polymer may include about 0.1 mol % to about 15 mol % of the repeating unit represented by the Chemical Formula 1, about 0.1 mol % to about 15 mol % of the repeating unit represented by the Chemical Formula 2, and about 75 mol % to about 85 mol % of the repeating unit B based on 100 mol % of the total amount of the repeating units. While not wishing to be bound by theory, it is believed when the repeating units A and B are included within the foregoing range, heat resistance, for example, glass transition temperature ($T_g$), of the polymer, may be improved.

While not wishing to be bound by theory, it is believed when the polymer includes a repeating unit including the saturated hydrocarbon represented by the above Chemical Formula 2, the repeating unit may decrease photo elastic coefficiency of the optical film including the polymer.

The optical film may have an in-phase phase-difference value ($R_e$) ranging from about 0 nanometers (nm) to about 500 nm at a wavelength of about 550 nm. When the optical film has an in-phase phase-difference value ($R_e$) within the foregoing range, it may be effectively used for various applications, including display devices. Specifically, the optical film may have an in-phase phase-difference value ($R_e$) ranging from about 50 nm to about 200 nm at a wavelength of about 550 nm, more specifically from about 75 nm to about 175 nm at a wavelength of about 550 nm.

The optical film may have a thickness direction phase-difference value ($R_{th}$) ranging from about 0 nm to about −1000 nm at a wavelength of about 550 nm. When the optical film has a thickness direction phase-difference value ($R_{th}$) within the range, it may be effectively used for various applications, including display devices. In an embodiment, the optical film may have a thickness direction phase-difference value ($R_{th}$) ranging from about 0 nm to about −500 nm at a wavelength of about 550 nm, more specifically from about 0 nm to about −300 nm at a wavelength of about 550 nm.

The optical film may have a short wavelength dispersion of the in-phase phase-difference value ($R_e$) (450 nm/550 nm) in a range of about 0.81 to about 1.20, specifically about 0.81 to about 1.16, and more specifically about 0.90 to about 1.12. In addition, the optical film may have a long wavelength dispersion of the in-phase phase-difference value ($R_e$) (650 nm/550 nm) in a range of about 0.90 to about 1.18, specifically about 0.95 to about 1.18, and more specifically about 0.95 to about 1.12.

Herein, the short wavelength dispersion of the in-phase phase-difference value ($R_e$) (450 nm/550 nm) is obtained by dividing the in-phase phase-difference value ($R_e$) at a wavelength of about 450 nm by the in-phase phase-difference value ($R_e$) at a wavelength of about 550 nm. The long wavelength dispersion of the in-phase phase-difference value ($R_e$) (650 nm/550 nm) is obtained by dividing the in-phase phase-difference value ($R_e$) at a wavelength of about 650 nm by the in-plane phase-difference value ($R_e$) at a wavelength of about 550 nm. When the optical film has short and long wavelength dispersions within the foregoing ranges, the optical film may have effective negative birefringence and thus, excellent or improved reverse wavelength dispersibility when combined with a positive birefringence resin or a positive birefringence film. In an embodiment, the optical film may have a short wavelength dispersion in the in-phase phase-difference value ($R_e$) (450 nm/550 nm) of less than about 1 and the long wavelength dispersion of the in-phase phase-difference value ($R_e$) (650 nm/550 nm) of greater than about 1.

The polymer may have a number average molecular weight ("Mn") of about 10,000 grams per mole (g/mol) to about 200,000 g/mol. When the polymer has a number average molecular weight (Mn) within the foregoing range, the polymer has a melting viscosity effective to facilitate the formation of a film. In an embodiment, the polymer may have a number average molecular weight ("Mn") of about 50,000 g/mol to about 100,000 g/mol, and more specifically about 50,000 g/mol to about 75,000 g/mol.

The polymer may have a weight average molecular weight ("Mw") of about 30,000 g/mol to about 500,000 g/mol. When the polymer has a weight average molecular weight (Mw) within the foregoing range, the polymer has a melting viscosity effective to facilitate the formation of a film. In an embodiment, the polymer may have a weight average molecular weight of about 100,000 g/mol to about 300,000 g/mol, and more specifically about 125,000 g/mol to about 200,000 g/mol.

The polymer may have a polydispersity index ("PDI") of about 1.0 to about 5.0. When the polymer has a polydispersity index within the foregoing range, a film formed from the polymer may have excellent or improved quality, reproducibility, and uniformity. In an embodiment, the polymer may have a polydispersity index of about 1.2 to about 3.5, or about 1.5 to about 2.5, and more specifically about 1.5 to about 3.0

The polymer may have a refractive index of about 1.40 to about 1.69. When the polymer has a refractive index within the foregoing range, an optical film including the polymer may have an effective phase-difference value. In an embodiment, the polymer may have a refractive index of about 1.45 to about 1.65, and more specifically about 1.50 to about 1.62.

The polymer may have glass transition temperature ("$T_g$") of about 80° C. to about 200° C. When the polymer has a glass transition temperature within the foregoing range, an optical film formed from the polymer may have excellent or improved heat resistance. In addition, the polymer may have a similar glass transition temperature ("$T_g$") to that of a widely used positive birefringence resin and thus, may be easily laminated or coextruded with the positive birefringence resin and have a wider process condition range in an elongation process and the like, when combined with a positive birefringence resin. In an embodiment, the polymer may have a glass transition temperature ("$T_g$") of about 85° C. to about 150° C., and more specifically about 92° C. to about 150° C.

Accordingly, the polymer may be used to form various optical films for a variety of applications including those where a wide viewing angle is desired.

The optical film including such a polymer may have an average light transmittance of greater than or equal to about 80% at a wavelength range of about 380 nanometers (nm) to about 780 nm. When the optical film has light transmittance within the foregoing range, the luminescence characteristics and color reproducibility of the optical film may not deteriorate. In an embodiment, the optical film may have an average light transmittance of greater than or equal to about 90% in a wavelength range of about 380 nm to about 780 nm, and more specifically an average light transmittance of greater than or equal to about 93% in a wavelength range of about 380 nm to about 780 nm.

The optical film may have a haze of less than or equal to about 3%. When the optical film has haze within the foregoing range, the optical film may be effectively transparent and have excellent or improved clarity. In an embodiment, the optical film may have haze of less than or equal to about 1.5%, and more specifically haze of less than or equal to about 1%.

The optical film may have a yellow index ("YI") of less than or equal to about 3.0. When the optical film has a yellow index ("YI") within the foregoing range, it may be transparent and colorless. In an embodiment, the optical film may have a yellow index ("YI") of about 0.5 to about 3.0, and more specifically about 1.0 to about 3.0.

The optical film may have a thickness ranging from about 0.01 micrometers (µm) to about 1,000 µm, specifically about 1 µm to about 500 µm, more specifically about 10 µm to about 100 µm, but is not limited thereto, and the thickness may be adjusted depending on the application of the optical film.

The optical film may have a glass transition temperature ("$T_g$") of about 80° C. to about 200° C. When the optical film has a glass transition temperature within the foregoing range, it may have excellent or improved heat resistance and a wider process condition range in an elongation process and the like. In an embodiment, the optical film may have a glass transition temperature ("$T_g$") of about 100° C. to about 150° C., and more specifically about 105° C. to about 145° C.

Hereinafter, a method of preparing the polymer is described, but is not limited thereto.

In an embodiment, a method of preparing the polymer includes combining (e.g. mixing) a monomer represented by the following Chemical Formulas 1-1 to 3-1, or a combination thereof, a monomer including an unsaturated bond copolymerizable with the monomer represented by the Chemical Formula 1-1 to 3-1, and a free radical initiator, for example an azo-containing initiator or a peroxide-containing initiator, to form a mixture; and polymerizing the mixture to provide the polymer. The combining may be performed in any order, for example, the monomers may first be combined and the free radical initiator may be added thereto, or the free radical initiator may be combined with any one or more of the monomers prior to addition of the remaining monomers.

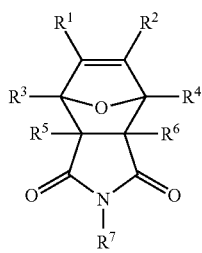

Chemical Formula 1-1

In Chemical Formula 1-1,
$R^1$ to $R^7$ are the same as defined in Chemical Formula 1.

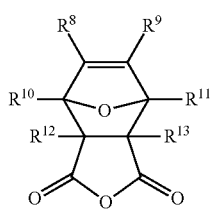

Chemical Formula 2-1

In Chemical Formula 2-1,
$R^8$ to $R^{13}$ are the same as defined in Chemical Formula 2.

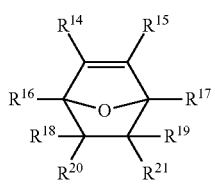

Chemical Formula 3-1

In Chemical Formula 3-1,
$R^{14}$ to $R^{21}$ are the same as defined in Chemical Formula 3.

The monomer including an unsaturated bond copolymerizable with the monomer represented by the Chemical Formula 1-1 to 3-1 may include tetrasubstituted, trisubstituted, disubstituted, or monosubstituted C=C bond, for example a vinyl or an allyl bond, and may further include a substituted or unsubstituted C6-C30 aromatic group or a substituted or unsubstituted C2-C30 ester group. In an embodiment the monomer copolymerizable with the monomer represented by the Chemical Formula 1-1 to 3-1, may include a monomer represented by the following Chemical Formula 4-1, a monomer represented by the following Chemical Formula 5-1, or a combination thereof, but is not limited thereto.

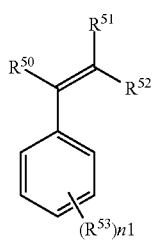

Chemical Formula 4-1

In Chemical Formula 4-1,
$R^{50}$ to $R^{53}$ and n1 are the same as defined in Chemical Formula 4.

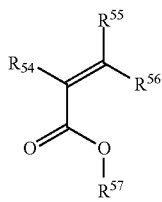

Chemical Formula 5-1

In Chemical Formula 5-1,
$R^{54}$ to $R^{57}$ are the same as defined in Chemical Formula 5.

In an embodiment, the monomer represented by Chemical Formula 1-1 may include a monomer represented by the following Chemical Formulas 31-1 to 31-3, or a combination thereof, but is not limited thereto.

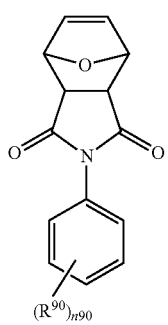

Chemical Formula 31-1

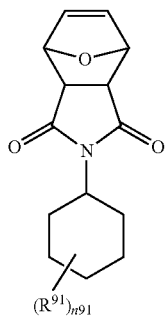

Chemical Formula 31-2

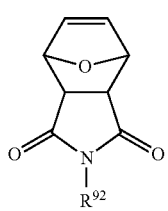

Chemical Formula 31-3

In Chemical Formulas 31-1 to 31-3,
$R^{90}$ to $R^{92}$, n90 and n91 are the same as defined in Chemical Formulas 11-1 to 11-3.

In an embodiment, the monomer represented by Chemical Formula 1-1 may include a monomer represented by the following Chemical Formulas 41-1 to 41-3, or a combination thereof, the monomer represented by Chemical Formula 2-1 may include a monomer represented by the following Chemical Formula 42-1, the monomer represented by Chemical Formula 3-1 may include a monomer represented by the following Chemical Formula 43-1, a monomer represented by the following Chemical Formula 43-2, or a combination thereof, the monomer represented by Chemical Formula 4-1 may include a monomer represented the following Chemical Formula 44-1, a monomer represented the following Chemical Formula 44-2, or a combination thereof, and the monomer represented by Chemical Formula 5-1 may include a monomer represented the following Chemical Formula 45-1, a monomer represented the following Chemical Formula 45-2, or a combination thereof, but they are not limited thereto.

Chemical Formula 41-1

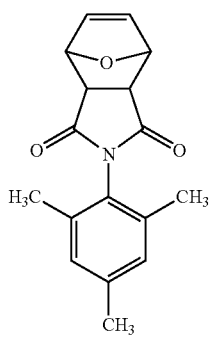

Chemical Formula 41-2

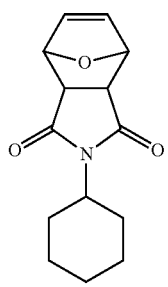

Chemical Formula 41-3

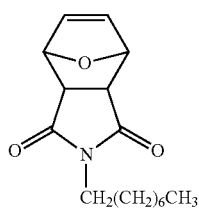

Chemical Formula 42-1

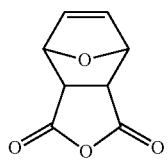

Chemical Formula 43-1

Chemical Formula 43-2

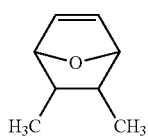

Chemical Formula 44-1

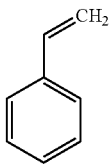

Chemical Formula 44-2

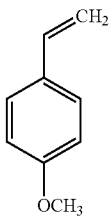

Chemical Formula 45-1

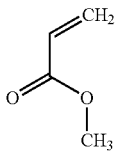

Chemical Formula 45-2

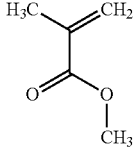

As stated above, other types of monomers may be used instead of or in addition to the repeating unit represented by Chemical Formula 4-1, Chemical Formula 5-1, or a combination thereof, provided that the other monomers comprise an unsaturated bond copolymerizable with the repeating unit A, and the desired properties of the polymer are not significantly adversely affected, for example heat resistance, moisture resistance, and negative birefringence, and provided that the polymer can be processed to form an optical film and is suitable for use in an intended device, for example a display device, Other types of monomers comprising an unsaturated bond copolymerizable with the repeating unit A include a substituted or unsubstituted vinyl ester monomer, a substituted or unsubstituted vinyl ether monomer, a substituted or unsubstituted allyl ether monomer, a substituted or unsubstituted allyl ester monomer, a substituted or unsubstituted itaconimide monomer, or the like. Such monomers may include other polymer repeating units, (e.g., amide units, carbonate units, ester units, ether units, imide units, siloxane units, silane units, and the like, as well as combinations thereof), for example a urethane di(meth)acrylate. In an embodiment, no monomers other than the monomers represented by Chemical Formulas 1-1 to 3-1, or a combination thereof, and the monomers represented by Chemical Formula 4-1, Chemical Formula 5-1, or a combination thereof, is used to manufacture the polymer.

In an embodiment, the copolymerizable monomer including an unsaturated bond, for example the monomers represented by Chemical Formula 4-1, the monomer represented by Chemical Formula 5-1, and a combination thereof may further include a monomer represented by the following Chemical Formula 8-1, without limitation.

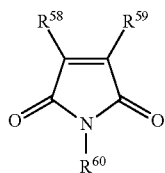

Chemical Formula 8-1

In Chemical Formula 8-1, $R^{58}$ to $R^{60}$ are the same as defined in Chemical Formula 8.

In an embodiment, the monomer represented by Chemical Formula 8-1 may include a monomer represented by the following Chemical Formula 38-1, a monomer represented by the following Chemical Formula 38-2, or a combination thereof, but is not limited thereto.

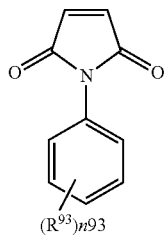

Chemical Formula 38-1

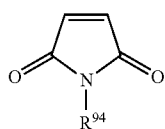

Chemical Formula 38-2

In Chemical Formulas 38-1 and 38-2, $R^{93}$, $R^{94}$, and n93 are the same as defined in Chemical Formulas 18-1 and 18-2.

In another embodiment, the monomer represented by Chemical Formula 8-1 may include a monomer represented by the following Chemical Formulas 48-1 to 48-3, or a combination thereof, but is not limited thereto.

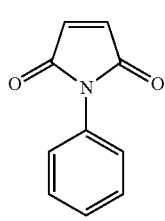

Chemical Formula 48-1

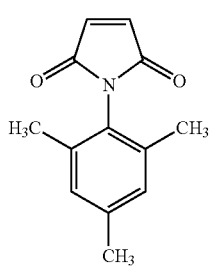

Chemical Formula 48-2

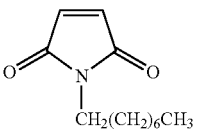

Chemical Formula 48-3

The monomer represented by Chemical Formulas 1-1 to 3-1, or a combination thereof, together with the monomer represented by Chemical Formula 4-1, the monomer represented by Chemical Formula 5-1, or a combination thereof and optionally a monomer represented by Chemical Formula 8-1 may be mixed in a solvent. In an embodiment, the monomers may be easily mixed without using a solvent, when the monomer represented by Chemical Formula 4-1, the monomer represented by Chemical Formula 5-1, or a combination thereof, dissolves the monomer represented by Chemical Formulas 1-1 to 3-1, or a combination thereof.

When a solvent is used, the solvent may dissolve the monomers and generate heat, and thus may effectively facilitate polymerization of the monomers. The solvent may be a benzene-containing solvent such as benzene, ethyl benzene, toluene, xylene, cresol, ore the like; an aliphatic-containing solvent such as pentane, cyclopentane, hexane, cyclohexane, heptane, or the like; a halogen-containing solvent such as methylene chloride, chloroform, or the like; tetrahydrofuran; ethyl acetate; dimethyl formamide; dimethyl acetamide; diethyl ether, petroleum ether, dimethylsulfoxide, acetonitrile, methanol, ethanol, or the like. Each of the foregoing solvents may be used singularly or as a combination, but is not limited thereto.

When the solvent is used, the solvent may be used in an amount of about 10 parts by weight to about 50 parts by weight based on 100 parts by weight of the monomers, specifically about 15 parts by weight to about 45 parts by weight based on 100 parts by weight of the monomer, more specifically about 20 parts by weight to about 40 parts by weight based on 100 parts by weight of the monomer, but is not limited thereto, and may be adjusted to obtain a desired molecular weight and dispersibility.

When the monomer represented by Chemical Formulas 1-1 to 3-1 is mixed with the monomer represented by Chemical Formula 4-1, the monomer represented by Chemical Formula 5-1, or a combination thereof, and a free radical initiator, to form a mixture, the resultant mixture may be easily polymerized by the free radical initiator, for example an azo-containing initiator or a peroxide-containing initiator to form the polymer without the use of a metal catalyst. Polymers formed under these conditions have excellent or improved processability and economic feasibility.

A metal catalyst may be used as an initiator instead of the free radical initiator, for example the azo-containing initiator or the peroxide-containing initiator, but it makes it difficult to control a preparing process and makes the process complex, deteriorating processability and economic feasibility. In addition, it is possible the metal catalyst may not be completely refined, i.e. purified, and some of the impurities or metal catalyst residue may remain, which may scatter light and be seen as a color stain.

The azo-containing initiator may include 2,2'-azobisisobutyronitrile, 2,2'-azobis(2-methylpropinonitrile), 2,2'-azobis(2-methylbutyronitrile), 2,2'-azobis(2,4-dimethylvaleronitrile), 2,2'-azobis(N,N'-dimethyleneisobutyroamidine) dihydrochloride, azobis(2-amidinopropane) dihydrochloride, 1,1'-azobis(cyclohexanecarbonitrile), 4,4-azobis(4-cyanovaleric acid), 2,2'-azobis(4-methoxy-2,4-dimethylvaleronitrile), 4,4'-azobis(4-cyanovaleric) acid, 2,2'-azobis[2-methyl-N-(1,1-bis(hydroxymethyl)-2-hydroxyethyl) propionamide], 2,2'-azobis[2-methyl-N-(2-hydroxyethyl) propionamide], or a combination thereof, but is not limited thereto.

The peroxide-containing initiator may include a substituted or unsubstituted arylperoxide, a substituted or unsubstituted alkylperoxide, a substituted or unsubstituted hydroperoxide, a substituted or unsubstituted peroxy ester, a substituted or unsubstituted peroxy carbonate, or a combination thereof. The peroxide-containing initiator may include benzoyl peroxide, t-butylperoxy-2-ethyl hexanoate, dicumyl peroxide, t-butyl peroxide, 1,1-di(t-butylperoxy)cyclohexane, dibenzoyl peroxide, 2-butanone peroxide, t-butyl perbenzoate, 2,5-bis(t-butylperoxy)-2,5-dimethylhexane, bis(t-butylperoxyisopropyl)benzene, t-butyl hydroperoxide, or a combination thereof, but is not limited thereto.

The free radical initiator, for example the azo-containing initiator or the peroxide-containing initiator may be used in an amount of about 0.001 parts by weight to about 10 parts by weight based on 100 parts by weight of the total weight of all monomers.

The polymerization may be performed at a temperature effective to initiate polymerization (i.e., effective to thermally decompose the free radical initiator), for example a temperature ranging from about 60° C. to about 200° C., specifically, about 70° C. to about 150° C., and more specifically, about 80° C. to about 150° C. In an embodiment, the polymerization may be performed with a reaction time ranging from about 1 hour to about 48 hours, specifically about 10 hours to about 24 hours, and more specifically about 12 hours to about 20 hours. When the polymerization is performed within the foregoing process condition ranges, the polymer may have a desired number average molecular weight ("Mn"), weight average molecular weight ("Mw"), dispersibility, and a stable polymerization yield may be achieved, for example, a polymerization yield of greater than or equal to about 60%, specifically greater than or equal to about 65%, more specifically greater than or equal to about 70%.

The monomer represented by Chemical Formulas 1-1 to 3-1, or a combination thereof, and the monomers represented by Chemical Formulas 4-1 to 5-1, or a combination thereof may be mixed in a mole ratio of about 0.1:99.9 to about 50:50. While not wishing to be bound by theory, it is believed when each monomer is mixed within the foregoing range, the monomers may be effectively polymerized by the free radical initiator, for example the azo-containing initiator or the peroxide-containing initiator and effectively improve negative birefringence, heat resistance, and moisture resistance of the polymer including the monomers. In an embodiment, the monomer represented by Chemical Formulas 1-1 to 3-1 and the monomer represented by Chemical Formula 4-1 to 5-1, or a combination thereof may be mixed in a mole ratio of about 1:99 to about 30:70, and more specifically about 5:95 to about 20:80. When an additional monomer other than the monomers represented by Chemical Formula 1-1 to 3-1 and the monomers represented by Chemical Formulas 4-1 to 5-1, or a combination thereof, is present during polymerization, such monomers are present in an amount ranging from about 0.1 to about 10 mole percent, or about 0.1 to about 5 mole percent, based on the total moles of monomers used to manufacture the polymer for an optical film.

According to another embodiment an optical film includes a polymer including, a repeating unit C including a repeating unit represented by the above Chemical Formulas 1 to 5, or a combination thereof; and a repeating unit D derived from a monomer having an unsaturated bond copolymerizable with the repeating unit C.

Since the repeating unit C has excellent or improved negative birefringence and excellent or improved heat resistance and moisture resistance, the repeating unit C may provide a polymer including the same and an optical film including the polymer with negative birefringence and improved heat resistance and moisture resistance.

In addition, since the repeating unit C is derived from a monomer, for example a monomer including an oxy group, or a monomer comprising an unsaturated bond further comprising a substituted or unsubstituted C6-C30 aromatic group or a substituted or unsubstituted C2-C30 ester group, polymerization of the monomer is easily initiated by a free radical initiator, for example an azo-containing initiator or a peroxide-containing initiator, and the repeating unit C may be prepared without the use of a metal catalyst and thus, may have excellent or improved processability and economic feasibility.

The repeating unit C may further include a repeating unit represented by the above Chemical Formula 8.

While not wishing to be bound by theory, it is believed when the repeating unit C further includes a repeating unit represented by the above Chemical Formula 8, an imide cyclic group included therein may widen the heat resistance adjustment range of a polymer. This cyclic structure included in a polymer main chain of the polymer may improve mechanical strength, for example, hardness of an optical film.

The repeating unit D is derived from a monomer comprising an unsaturated bond copolymerizable with the repeating unit C. In an embodiment, the unsaturated bond of the monomer, may include a double bond in a ring of a substituted or unsubstituted C3 to C30 alicyclic group, or a double bond in a ring of a substituted or unsubstituted C2 to C30 heterocyclic group, wherein the alicyclic group, or heterocyclic group is optionally bridged, including a C1 to C2 alkylene bridge or an oxy bridge, and is present singularly, or at least two of the alicyclic group, or heterocyclic group are linked to provide a condensed ring, wherein at least one ring of the condensed ring includes a double bond, and any additional rings of the condensed ring may be saturated, or partially saturated. For example, the repeating unit D may include a repeating unit represented by the following Chemical Formula 6, which is not the same as Chemical Formula 1, a repeating unit represented by the following Chemical Formula 7, or a combination thereof.

[Chemical Formula 6]

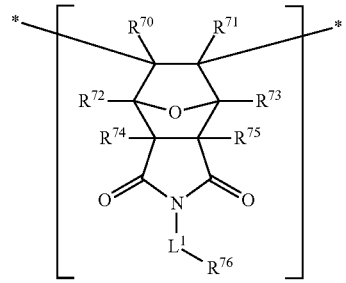

In Chemical Formula 6,
$R^{70}$ to $R^{75}$ are the same or different in each repeating unit and are each independently hydrogen, or a substituted or unsubstituted C1 to C10 aliphatic group, and in an embodiment, $R^{70}$ to $R^{75}$ are each independently hydrogen, or a substituted or unsubstituted C1 to C5 aliphatic group, and in another embodiment, $R^{70}$ to $R^{75}$ are each hydrogen.

$L^1$ in Chemical Formula 6 is the same or different in each repeating unit and each is independently a substituted or unsubstituted C1 to C5 linear or branched alkylene group, —C(=O)NH—, —NHC(=O)—, —C(=O)O—, or —OC(=O)—, and in an embodiment, $L^1$ is a substituted or unsubstituted C1 to C3 linear or branched alkylene group, —C(=O)NH—, —NHC(=O)—, —C(=O)O—, or —OC(=O)—, and in another embodiment, $L^1$ is a methylene group, an ethylene group, —C(=O)NH—, —NHC(=O)—, —C(=O)O—, or —OC(=O)—.

$R^{76}$ in Chemical Formula 6 is the same or different in each repeating unit, and each is independently a substituted or unsubstituted C3 to C30 alicyclic group, a substituted or unsubstituted C6 to C30 aromatic group, or a substituted or unsubstituted C2 to C30 heterocyclic group, wherein the alicyclic group, aromatic group, or heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In an embodiment, $R^{76}$ in Chemical Formula 6 is the same or different in each repeating unit, and each is independently a substituted or unsubstituted C3 to C20 alicyclic group, a substituted or unsubstituted C6 to C20 aromatic group, or a substituted or unsubstituted C2 to C20 heterocyclic group, and in another embodiment, $R^{76}$ in Chemical Formula 6 is the same or different in each repeating unit, and each is independently a substituted or unsubstituted C3 to C10 cycloalkyl group, a substituted or unsubstituted C6 to C15 aromatic group, or a substituted or unsubstituted C2 to C15 heterocyclic group, wherein the alicyclic group, the aromatic group or the heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

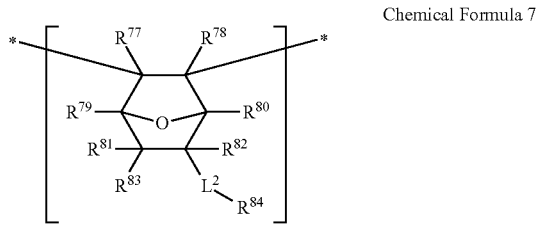

Chemical Formula 7

In Chemical Formula 7, $R^{77}$ to $R^{82}$ are the same or different in each repeating unit and are each independently hydrogen, or a substituted or unsubstituted C1 to C10 aliphatic group, and in an embodiment, $R^{77}$ to $R^{82}$ are each independently hydrogen, or a substituted or unsubstituted C1 to C5 aliphatic group, and in another embodiment, $R^{77}$ to $R^{82}$ are each hydrogen.

$R^{83}$ in Chemical Formula 7 is the same or different in each repeating unit, and each is independently hydrogen, a substituted or unsubstituted C1 to C30 aliphatic group, a substituted or unsubstituted C3 to C30 alicyclic group, a substituted or unsubstituted C6 to C30 aromatic group, a substituted or unsubstituted C2 to C30 heterocyclic group, a carboxyl group, or a substituted or unsubstituted C2 to C30 ester group, wherein the alicyclic group, aromatic group, or heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In an embodiment, $R^{83}$ in Chemical Formula 6 is the same or different in each repeating unit, and each is independently hydrogen, a substituted or unsubstituted C1 to C20 aliphatic group, a substituted or unsubstituted C3 to C20 alicyclic group, a substituted or unsubstituted C6 to C20 aromatic group, or a substituted or unsubstituted C2 to C20 heterocyclic group, a carboxyl group, or a substituted or unsubstituted C2 to C20 ester group, and in another embodiment, $R^{83}$ is hydrogen, a substituted or unsubstituted C1 to C10 alkyl group, a substituted or unsubstituted C3 to C10 cycloalkyl group, a substituted or unsubstituted C6 to C15 aromatic group, or a substituted or unsubstituted C2 to C15 heterocyclic group, a carboxyl group, or a substituted or unsubstituted C2 to C10 ester group, wherein the alicyclic group, the aromatic group or the heterocyclic group is present singularly; at least two of the alicyclic group, aromatic group, or heterocyclic group are linked to provide a condensed ring; or at least two of the alicyclic group, aromatic group, or heterocyclic group are linked via a single bond, or a functional group selected from —O—, —S—, —C(=O)—, —CH(OH)—, —S(=O)$_2$—, —Si(CH$_3$)$_2$—, —(CH$_2$)$_p$—(wherein 1≤p≤10), —(CF$_2$)$_q$— (wherein 1≤q≤10), —C(CH$_3$)$_2$—, —C(CF$_3$)$_2$—, or —C(=O)NH—.

$L^2$ in Chemical Formula 6 is the same or different in each repeating unit, and each is independently a substituted or unsubstituted C1 to C5 linear or branched alkylene group, —C(=O)NH—, —NHC(=O)—, —C(=O)O—, or —OC(=O)—, and in an embodiment, $L^2$ is a substituted or unsubstituted C1 to C3 linear or branched alkylene group, —C(=O)NH—, —NHC(=O)—, —C(=O)O—, or —OC(=O)—, and in another embodiment, $L^2$ is a methylene group, an ethylene group, —C(=O)NH—, —NHC(=O)—, —C(=O)O—, or —OC(=O)—.

$R^{84}$ in Chemical Formula 6 is the same or different in each repeating unit and each is independently a substituted or unsubstituted C3 to C30 alicyclic group, a substituted or unsubstituted C6 to C30 aromatic group, or a substituted or unsubstituted C2 to C30 heterocyclic group, wherein the alicyclic group, aromatic group, or heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—

In an embodiment, $R^{84}$ in Chemical Formula 6 is the same or different in each repeating unit, and each is independently a substituted or unsubstituted C3 to C20 alicyclic group, a substituted or unsubstituted C6 to C20 aromatic group, or a substituted or unsubstituted C2 to C20 heterocyclic group, and in another embodiment, $R^{84}$ is a substituted or unsubstituted C3 to C10 cycloalkyl group, a substituted or unsubstituted C6 to C15 aromatic group, or a substituted or unsubstituted C2 to C15 heterocyclic group, wherein the alicyclic group, the aromatic group or the heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In an embodiment, the repeating unit represented by Chemical Formula 6 may include a repeating unit represented by the following Chemical Formulas 16-1 to 16-3, or a combination thereof, and the repeating unit represented by Chemical Formula 7 may include a repeating unit represented by the following Chemical Formula 17-1, a repeating unit represented by the following Chemical Formula 17-2, or a combination thereof, but they are not limited thereto.

Chemical Formula 16-1

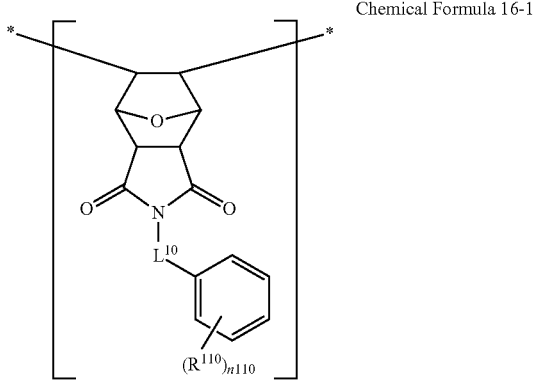

Chemical Formula 16-2

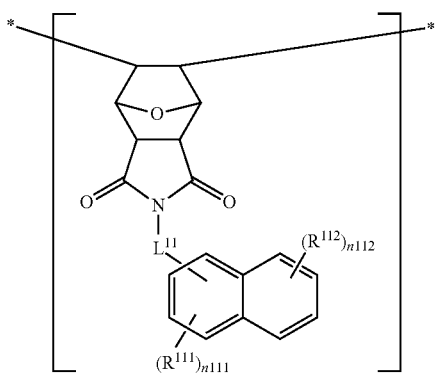

Chemical Formula 16-3

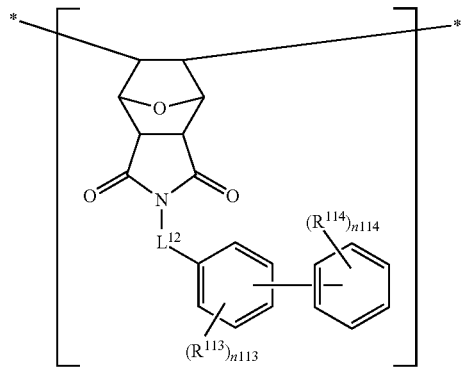

In Chemical Formulas 16-1 to 16-3, $L^{10}$ to $L^{12}$ are the same or different in each repeating unit and are each independently a substituted or unsubstituted C1 to C5 linear or branched alkylene group, —C(=O)NH—, —NHC(=O)—, —C(=O)O—, or —OC(=O)—, and in an embodiment, $L^{10}$ to $L^{12}$ are a substituted or unsubstituted C1 to C3 linear or branched alkylene group, —C(=O)NH—, —NHC(=O)—, —C(=O)O—, or —OC(=O)—, and in another embodiment, $L^{10}$ to $L^{12}$ are a methylene group, an ethylene group, —C(=O)NH—, —NHC(=O)—, —C(=O)O—, or —OC(=O)—.

$R^{110}$ to $R^{114}$ in Chemical Formulas 16-1 to 16-3 are the same or different in each repeating unit and are each independently hydrogen, or a C1 to C20 alkyl group, and in an embodiment, $R^{110}$ to $R^{114}$ are each independently hydrogen, or a C1 to C10 alkyl group, and in another embodiment, $R^{110}$ to $R^{114}$ are each hydrogen.

n110 and n114 in Chemical Formulas 16-1 to 16-3 are the same or different in each repeating unit and are each independently an integer ranging from 0 to 5, n111 is the same or different in each repeating unit, and each is independently an integer ranging from 0 to 3, and n112 and n113 the same or different in each repeating unit and are each independently an integer ranging from 0 to 4.

Chemical Formula 17-1

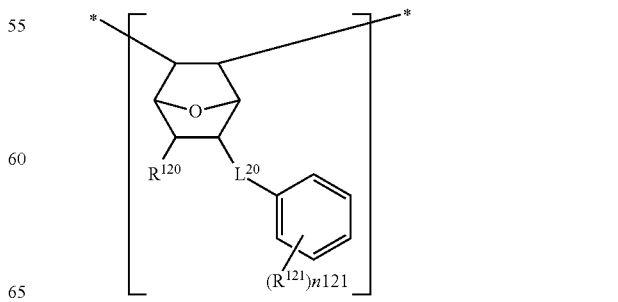

-continued

Chemical Formula 17-2

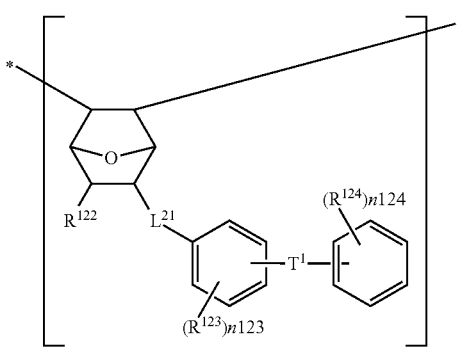

In Chemical Formulas 17-1 and 17-2, $L^{20}$ and $L^{21}$ are the same or different in each repeating unit and are each independently a substituted or unsubstituted C1 to C5 linear or branched alkylene group, —C(=O)NH—, —NHC(=O)—, —C(=O)O—, or —OC(=O)—, and in an embodiment, $L^{20}$ and $L^{21}$ are each independently a substituted or unsubstituted C1 to C3 linear or branched alkylene group, —C(=O)NH—, —NHC(=O)—, —C(=O)O— or —OC(=O)—, and in another embodiment, $L^{20}$ and $L^{21}$ are each independently a methylene group, an ethylene group, —C(=O)NH—, —NHC(=O)—, —C(=O)O—, or —OC(=O)—.

$T^1$ in Chemical Formulas 17-1 and 17-2 is the same or different in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

$R^{120}$ and $R^{122}$ in Chemical Formulas 17-1 and 17-2 are the same or different in each repeating unit and are each independently hydrogen, a substituted or unsubstituted C1 to C10 alkyl group, a substituted or unsubstituted C3 to C10 cycloalkyl group, a substituted or unsubstituted C6 to C15 aromatic group, or a substituted or unsubstituted C2 to C15 heterocyclic group, a carboxyl group, or a substituted or unsubstituted C2 to C10 ester group.

$R^{121}$, $R^{123}$, and $R^{124}$ in Chemical Formulas 17-1 and 17-2 are the same or different in each repeating unit and are each independently hydrogen, or a C1 to C20 alkyl group, and in an embodiment, $R^{121}$, $R^{123}$ and $R^{124}$ are each independently hydrogen, or a C1 to C10 alkyl group, and in another embodiment, $R^{121}$, $R^{123}$ and $R^{124}$ are each hydrogen.

n121 and n124 in Chemical Formulas 17-1 and 17-2 are the same or different in each repeating unit and are each independently an integer ranging from 0 to 5, and n123 is the same or different in each repeating unit, and each is independently an integer ranging from 0 to 4.

In another embodiment, the repeating unit represented by Chemical Formula 6 may include a repeating unit represented by the following Chemical Formulas 26-1 to 26-3, or a combination thereof, and the repeating unit represented by Chemical Formula 7 may include a repeating unit represented by the following Chemical Formulas 27-1 to 27-4, or a combination thereof, but they are not limited thereto.

Chemical Formula 26-1

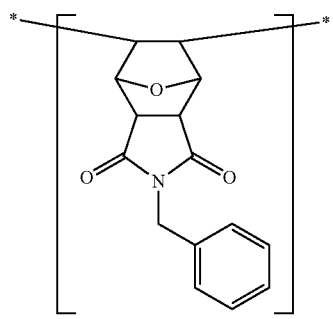

Chemical Formula 26-2

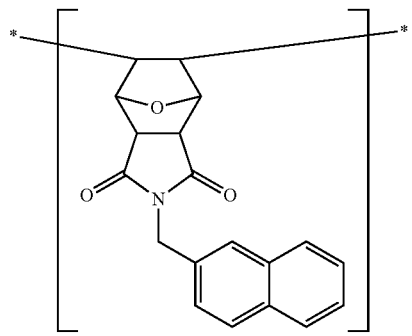

Chemical Formula 26-3

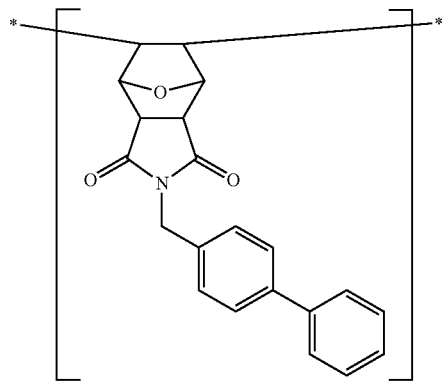

Chemical Formula 27-1

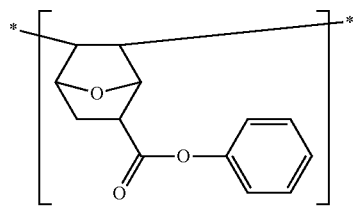

Chemical Formula 27-2

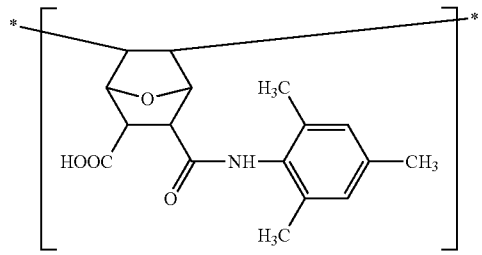

-continued

Chemical Formula 27-3

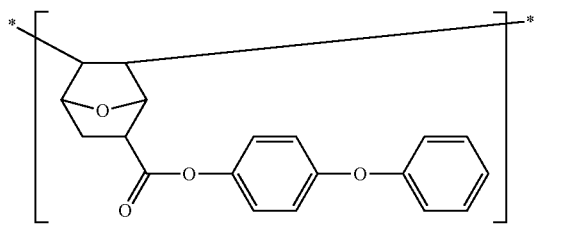

Chemical Formula 27-4

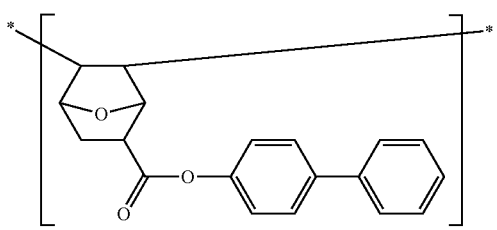

Other types of the repeating units D may be used instead of or in addition to the repeating unit represented by Chemical Formula 6, the repeating unit represented by Chemical Formula 7, or a combination thereof, provided that the other units may be derived from a monomer comprising an unsaturated bond copolymerizable with the repeating unit C, and the desired properties of the polymer are not significantly adversely affected, for example heat resistance, moisture resistance, negative birefringence, positive birefringence, and reverse wavelength dispersibility, and provided that the polymer can be processed to form an optical film and is suitable for use in an intended device, for example a display device. Other types of monomers comprising an unsaturated bond copolymerizable with the repeating unit C include a substituted or unsubstituted vinyl ester monomer, a substituted or unsubstituted vinyl ether monomer, a substituted or unsubstituted allyl ether monomer, a substituted or unsubstituted allyl ester monomer, a substituted or unsubstituted itaconimide monomer, or the like. Such monomers may include other polymer repeating units, (e.g., amide units, carbonate units, ester units, ether units, imide units, siloxane units, silane units, and the like, as well as combinations thereof), for example a urethane di(meth)acrylate. In an embodiment, no repeating units other than the repeating unit represented by Chemical Formulas 1 to 5, optional Chemical Formula 8, or a combination thereof, and the repeating units represented by Chemical Formulas 6 to 7, or a combination thereof, is present in the polymer.

The repeating unit D has excellent or improved positive birefringence and excellent or improved heat resistance and moisture resistance and thus, may improve heat resistance, moisture resistance, and positive birefringence of a polymer including the same, and an optical film including the same.

In addition, since the repeating unit D is derived from a monomer comprising an unsaturated bond copolymerizable with the repeating unit C, polymerization of the monomer may be easily initiated by a free radical initiator, for example an azo-containing initiator or a peroxide-containing initiator, and the repeating unit D may be prepared without the use of a metal catalyst, and thus, may have excellent or improved processibility and economic feasibility.

Accordingly, since the repeating unit C has excellent or improved negative birefringence, and the repeating unit D has excellent or improved positive birefringence, a polymer including the repeating units C and D and an optical film including the polymer, may have excellent or improved heat resistance, moisture resistance, and reverse wavelength dispersibility.

Herein, the polymer including a repeating unit C and a repeating unit D, and the optical film including the polymer, may have reverse wavelength dispersibility without an additional coextrusion or lamination process and thus, may effectively improve processibility and economic feasibility of the same.

In the optical film, the polymer may include the repeating units C and D in a mole ratio of about 1:2 to about 1:9. When the repeating units C and D are included within the foregoing range, the polymer may have excellent or improved reverse wavelength dispersibility, may easily generate haze, which may otherwise be difficult to generate due to lack of compatibility in coextrusion and lamination of positive and negative birefringence polymer resins, and may easily control an elongation temperature, due to a glass transition temperature ("$T_g$") difference of the positive and negative birefringence polymer resins. In addition, the polymer may form a thin reverse wavelength dispersion film, which in turn may form a thin final product, for example an optical film. Specifically, the polymer may include the repeating units C and D in a mole ratio of about 1.3 to about 1.7, and more specifically a mole ratio of about 1:4 to about 1:6, but is not limited thereto, and the polymer may include the repeating units C and D in various mole ratios depending on the monomers and structure of each monomer substituent, included in each repeating unit. If repeating units other than the repeating unit D are present, such units are present in an amount ranging from about 0.1 to about 10 mole percent, or about 0.1 to about 5 mole percent, based on the total moles of units in the polymer.

The optical film including the polymer may have a short wavelength dispersion of the in-plane phase-difference value ($R_e$) (450 nm/550 nm) of less than about 1, specifically less than about 0.95, and more specifically less than about 0.90, and a long wavelength dispersion of the in-plane phase-difference value ($R_e$) (650 nm/550 nm) of greater than about 1, specifically greater than about 1.05, more specifically greater than about 1.10. When the optical film has short and long wavelength dispersions within the foregoing ranges, the optical film may have sufficient reverse wavelength dispersibility and thus, when applied to a display device, such as LCD, OLED device, or the like, it may effectively improve the viewing angle, color shift, and reflection time of the display device.

The polymer may have a number average molecular weight ("Mn") of about 10,000 grams per mole (g/mol) to about 200,000 g/mol. When the polymer has a number average molecular weight (Mn) within the foregoing range, the polymer has a melting viscosity effective to facilitate the formation of a film. In an embodiment, the polymer may have a number average molecular weight ("Mn") of about 50,000 g/mol to about 100,000 g/mol, and more specifically about 50,000 g/mol to about 75,000 g/mol.

The polymer may have a weight average molecular weight ("Mw") of about 30,000 g/mol to about 500,000 g/mol. When the polymer has a weight average molecular weight ("Mw") within the foregoing range, the polymer has a melting viscosity effective to facilitate the formation of a film. In an embodiment, the polymer may have a weight average molecular weight of about 100,000 g/mol to about 300,000 g/mol, and more specifically about 125,000 g/mol to about 200,000 g/mol.

The polymer may have a polydispersity index ("PDI") of about 1.0 to about 5.0. When the polymer has a polydispersity index within the foregoing range, a film formed from the polymer may have excellent or improved quality, reproducibility, and uniformity. In an embodiment, the polymer may have a polydispersity index of about 1.2 to about 3.5, and more specifically about 2.0 to about 3.0.

The polymer may have a refractive index of about 1.40 to about 1.69. When the polymer has a refractive index within the foregoing range, an optical film including the polymer may have an effective phase-difference value. In an embodiment, the polymer may have a refractive index of about 1.45 to about 1.65, and more specifically about 1.48 to about 1.62.

The polymer may have glass transition temperature ("$T_g$") of about 80° C. to about 200° C. When the polymer has a glass transition temperature within the foregoing range, an optical film including the polymer may have excellent or improved heat resistance. In addition, the polymer may have a wider process condition range in an elongation process and the like. In an embodiment, the polymer may have a glass transition temperature ("$T_g$") of about 85° C. to about 150° C., and more specifically about 92° C. to about 150° C.

Accordingly, the polymer may be used to form various optical films for a variety of applications including those where a wide viewing angle is desired.

The optical film including the polymer may have an average light transmittance of greater than about 80% at a wavelength ranging from about 380 nm to about 780 nm. When the optical film has light transmittance within the foregoing range, the luminescence characteristics and color reproducibility of the optical film may not deteriorate. Specifically, the optical film may have an average light transmittance of greater than about 90% at a wavelength ranging from about 380 nm to about 780 nm, more specifically an average light transmittance of greater than about 93% at a wavelength range of about 380 nm to about 780 nm.

The optical film may have a haze of less than or equal to about 3%. When the optical film has haze within the foregoing range, the optical film may be effectively transparent and may have excellent or improved clarity. Specifically, the optical film may have haze of less than or equal to about 1.5% and more specifically, less than or equal to about 1%.

The optical film may have a yellow index ("YI") of less than or equal to about 3.0. When the optical film has a yellow index ("YI") within the foregoing range, it may be transparent and colorless. Specifically, the optical film may have a yellow index ("YI") ranging from about 0.5 to about 3.0, and more specifically about 1.0 to about 3.0.

The optical film may have a thickness ranging from about 0.01 micrometers (μm) to about 1000 μm, specifically about 1 μm to about 500 μm, more specifically about 10 μm to about 100 μm, but is not limited thereto and the thickness may be adjusted depending on the application of the optical film.

The optical film may have a glass transition temperature ("$T_g$") ranging from about 80° C. to about 200° C. When the optical film has a glass transition temperature within the foregoing range, it may have excellent or improved heat resistance and a wider process condition range in an elongation process and the like. Specifically, the optical film may have a glass transition temperature ("$T_g$") ranging from about 100° C. to about 150° C., and more specifically about 105° C. to about 145° C.

Hereinafter, a method of preparing the polymer is described, but the disclosure is not limited thereto.

In an embodiment, a method of preparing the polymer includes combining (e.g. mixing) a monomer represented by the above Chemical Formulas 1-1 to 5-1, or a combination thereof, a monomer including an unsaturated bond copolymerizable with the monomer represented by the Chemical Formulas 1-1 to 5-1, and a free radical initiator, for example an azo-containing initiator or a peroxide-containing initiator, to form a mixture; and polymerizing the mixture to provide the polymer. The combining may be performed in any order, for example, the monomers may first be combined and the free radical initiator may be added thereto, or the free radical initiator may be combined with any one or more of the monomers prior to addition of the remaining monomers.

The monomer including an unsaturated bond copolymerizable with the monomer represented by the Chemical Formulas 1-1 to 5-1 may include tetrasubstituted, trisubstituted, disubstituted, or monosubstituted C=C bond, for example a vinyl or an allyl bond. In an embodiment, the monomer including an unsaturated bond copolymerizable with the monomer represented by the Chemical Formulas 1-1 to 5-1 may include a substituted or unsubstituted C3 to C30 alicyclic group including a double bond in a ring, or a substituted or unsubstituted C2 to C30 heterocyclic group including a double bond in a ring, wherein the alicyclic group, or heterocyclic group is optionally bridged, including a C1 to C2 alkylene bridge or an oxy bridge, and is present singularly, or at least two of the alicyclic group, or heterocyclic group are linked to provide a condensed ring, wherein at least one ring of the condensed ring includes a double bond, and any additional rings of the condensed ring may be saturated, or partially saturated. In an embodiment the monomer copolymerizable with the monomer represented by the Chemical Formulas 1-1 to 5-1 may be a monomer represented by the following Chemical Formula 6-1, a monomer represented by the following Chemical Formula 7-1, or a combination thereof, but is not limited thereto.

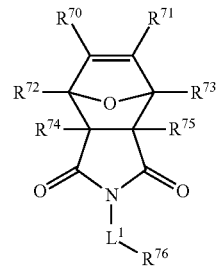

Chemical Formula 6-1

In Chemical Formula 6-1,
$R^{70}$ to $R^{75}$, $L^1$, and $R^{76}$ are the same as defined in Chemical Formula 6.

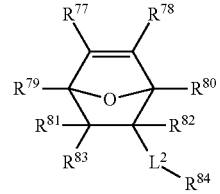

Chemical Formula 7-1

In Chemical Formula 7-1,
$R^{77}$ to $R^{84}$ and $L^2$ are the same as defined in Chemical Formula 7.

In an embodiment, the monomer represented by Chemical Formula 1-1 may include a monomer represented by the above Chemical Formulas 31-1 to 31-3, or a combination thereof, the monomer represented by Chemical Formula 2-1 may include a monomer represented by the above Chemical Formula 42-1, the monomer represented by Chemical Formula 3-1 may include a monomer represented by the above Chemical Formulas 43-1 to 43-2, or a combination thereof, the monomer represented by Chemical Formula 4-1 may include a monomer represented by the above Chemical Formulas 44-1 to 44-2, or a combination thereof, and the monomer represented by Chemical Formula 5-1 may include a monomer represented by the above Chemical Formulas 45-1 to 45-2, or a combination thereof, but they are not limited thereto.

In an embodiment, the monomer represented by Chemical Formula 6-1 may include a monomer represented by the following Chemical Formulas 36-1 to 36-3, or a combination thereof, the monomer represented by Chemical Formula 7-1 may include a monomer represented by the following Chemical Formula 37-1, a monomer represented by the following Chemical Formula 37-2, or a combination thereof, but they are not limited thereto.

Chemical Formula 36-1

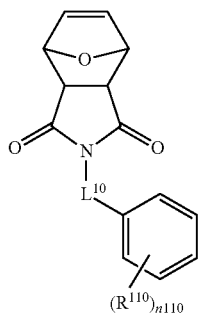

Chemical Formula 36-2

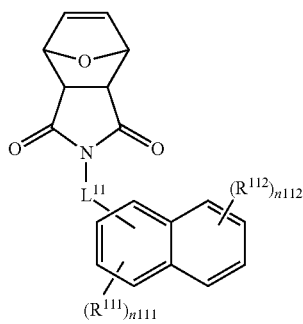

Chemical Formula 36-3

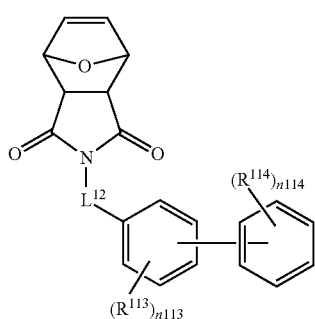

In Chemical Formulas 36-1 to 36-3, $L^{10}$ to $L^{12}$, $R^{110}$ to $R^{114}$, and n110 to n114, are the same as defined in Chemical Formulas 16-1 to 16-3.

Chemical Formula 37-1

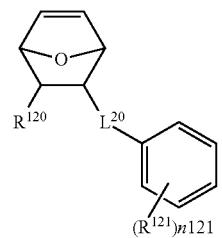

Chemical Formula 37-2

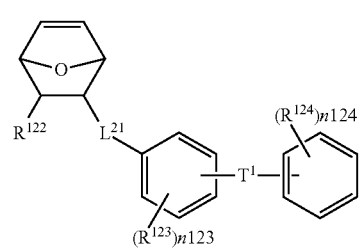

In Chemical Formulas 37-1 and 37-2, $L^{20}$ and $L^{21}$, $T^1$, $R^{120}$ to $R^{124}$, and n121 to n124, are the same as defined in Chemical Formulas 17-1 and 17-2.

In an embodiment, the monomer represented by Chemical Formula 6-1 may include a monomer represented by the following Chemical Formulas 46-1 to 46-3, or a combination thereof, and the monomer represented by Chemical Formula 7-1 may include a monomer represented by the following Chemical Formulas 47-1 to 47-4, or a combination thereof, but they are not limited thereto.

Chemical Formula 46-1

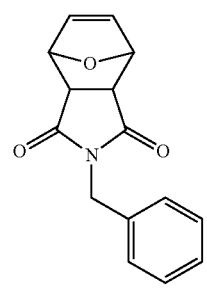

Chemical Formula 46-2

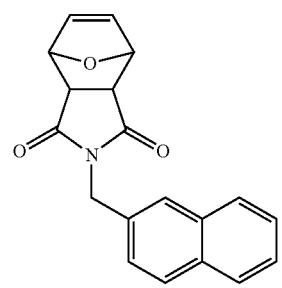

Chemical Formula 46-3

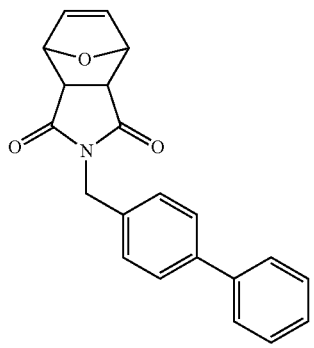

Chemical Formula 47-1

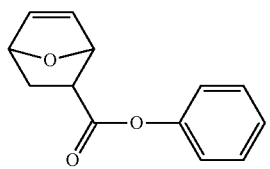

Chemical Formula 47-2

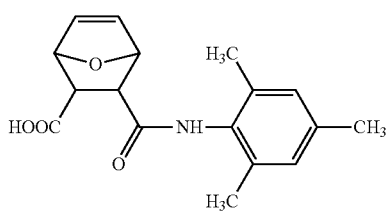

Chemical Formula 47-3

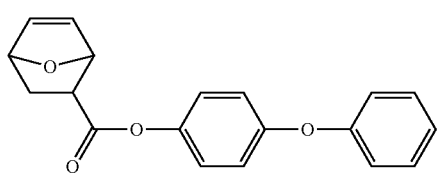

Chemical Formula 47-4

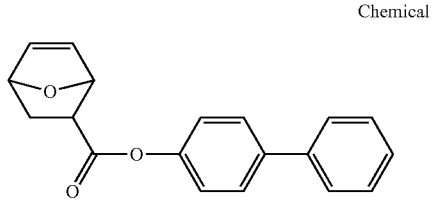

The monomers may further include a monomer represented by the above Chemical Formula 8-1 as well as one selected from monomers represented by the above Chemical Formulas 1-1 to 5-1, and a combination thereof, depending on the application of the optical film including a polymer including the monomers, but is not limited thereto.

In an embodiment, the monomer represented by Chemical Formula 8-1 may include a monomer represented by Chemical Formulas 38-1 to 38-2, or a monomer represented by Chemical Formulas 48-1 to 48-2, or a combination thereof or a combination thereof, but is not limited thereto.

The monomer represented by Chemical Formulas 1-1 to 5-1, or a combination thereof, and optionally the monomer represented by Chemical Formula 8-1, together with the monomer represented by Chemical Formula 6-1, the monomer represented by Chemical Formula 7-1, or a combination thereof may be mixed in a solvent, without limitation.

Hereinafter, the effect, type, and amount of the solvent used, are the same as aforementioned unless separately described.

When a monomer represented by the above Chemical Formulas 1-1 to 5-1, or a combination thereof, is mixed with a monomer represented by the above Chemical Formula 6-1, a monomer represented by the above Chemical Formula 7-1, or a combination thereof, and a free radical initiator to form a mixture, the resultant mixture may be easily polymerized by the free radical initiator, for example an azo-containing initiator or a peroxide-containing initiator, to form the polymer without the use of a metal catalyst. Polymers formed under these conditions have excellent or improved processability and economic feasibility.

Herein, a metal catalyst may be used as an initiator instead of the free radical initiator, for example the azo-containing initiator or the peroxide-containing initiator, but it is difficult to control a process of preparing the polymer with a metal catalyst, and further, a complex refinement process is needed, deteriorating processability and economic feasibility. In addition, it is possible the metal catalyst may not be completely refined, i.e. purified, and some of the impurities or metal catalyst residue may remain, which may scatter light and be seen as a color stain.

Hereinafter, the types and amounts of the azo-containing and peroxide-containing initiators, and the polymerization process are the same as aforementioned, unless mentioned otherwise.

The monomer represented by Chemical Formulas 1-1 to 5-1, or a combination thereof, and the monomer represented by Chemical Formula 6-1, the monomer represented by Chemical Formula 7-1, or a combination thereof may be mixed in a mole ratio of about 1:2 to about 1:9. While not wishing to be bound by theory, it is believed when each monomer is mixed within the foregoing range, the monomers may be effectively polymerized by the free radical initiator, for example the azo-containing initiator or the peroxide-containing initiator, and effectively improve reverse wavelength dispersibility, heat resistance, and moisture resistance of the resulting polymer. In an embodiment, the monomer represented by Chemical Formulas 1-1 to 5-1, or a combination thereof, and the monomer represented by Chemical Formula 6-1, the monomer represented by Chemical Formula 7-1, or a combination thereof may be mixed in a mole ratio of about 1:3 to about 1:7, more specifically about 1:4 to about 1:6. When an additional monomer other than the monomers represented by Chemical Formula 1-1 to 5-1 and the monomers represented by Chemical Formulas 6-1 to 7-1, or a combination thereof, is present during polymerization, such monomers are present in an amount ranging from about 0.1 to about 10 mole percent, or about 0.1 to about 5 mole percent, based on the total moles of monomers used to manufacture the polymer for an optical film.

Hereinafter, a method of preparing the optical film is described, but is not limited thereto.

According to an embodiment, the optical film may be fabricated by melting the polymer or dissolving it in an organic solvent, for example a solvent as described above for polymerization, such as toluene, methyl isobutyl ketone, cyclopentanone, methylene chloride, 1,2-dichloroethane, methyl amyl ketone, methyl ethyl ketone, methyl isoamyl ketone, or combinations thereof), spin-coating, spray coating, roll coating, curtain coating, dip coating, or placing the melted polymer or polymer solution in a mold, and compressing the polymer in the mold to form a sheet, and elongating the sheet to provide the optical film. A cast polymer or polymer solution may also be compressed using a nip roller, for example. Herein, the elongating of the sheet may be performed in a direction of one axis or performed sequentially or simultaneously in a direction of two axes.

According to an embodiment, a main chain of the polymer is aligned in an elongation axis direction by the elongating process and the repeating units A and B in a perpendicular direction to the alignment axis of the main chain of the polymer, such that the elongated sheet, i.e. the optical film, may effectively show negative birefringence.

According to another embodiment, a main chain of the polymer is aligned in an elongation axis direction by the elongating process and the repeating unit C is aligned in a perpendicular direction to the alignment axis of the main chain of the polymer, and simultaneously the repeating unit D is aligned in a direction parallel to the elongation axis direction, such that the elongated sheet, i.e. the optical film, may effectively show reverse wavelength dispersibility.

The sheet may be formed by compressing the melted polymer or the polymer solution with a high pressure at a temperature ranging from about 200° C. to about 300° C., specifically about 210° C. to about 290° C., more specifically at about 225° C. to about 275° C. In an embodiment, the sheet may be formed by discharging the melted polymer or the polymer solution in a chill roll through a T-die, without limitation.

The sheet may be elongated at a temperature ranging from about 100° C. to about 150° C., specifically about 105° C. to about 145° C., and more specifically about 110° C. to about 135° C.

In addition, the sheet may be elongated at an elongation rate ranging from about 10% to about 300%, specifically, about 20% to about 200%, and more specifically, about 20% to about 100%. Herein, the elongation rate is calculated according to the following Equation 1.

$$\text{Elongation}(\%) = (L - L_0/L_0) \times 100 \quad \text{Equation 1}$$

In Equation 1, $L_0$ refers to a length of a sheet before elongation, and

L refers to a length of a sheet after elongation.

The optical film may be formed as a single layer or multilayer using the polymer.

When the polymer is a negative birefringence polymer, a film including a positive birefringence polymer generally used in the related field, for example, a polyethylene terephthalate, polyethylene naphthalate, or cyclic olefin polymer ("COP"), may be laminated on a surface of the optical film to provide an optical film product. Accordingly, the resulting optical film product may have reverse wavelength dispersibility and form a compensation film for a variety of applications including those where a wide viewing angle is desired. When the optical film has reverse wavelength dispersibility, it may prevent color shift, and increase a contrast ratio. However, the optical film is not limited thereto but may be formed into a single layer or multilayer by combining (e.g. blending or copolymerizing) the negative birefringence polymer and a positive birefringence polymer known for use in the related field, e.g. optical films, such as polyethylene terephthalate and polyethylene naphthalate, and then forming a film from the combination. Herein, the optical film thus formed may be as a compensation film.

In an embodiment, when the polymer for preparing the optical film includes both of a repeating unit having positive birefringence and a repeating unit having negative birefringence and thus, has reverse wavelength dispersibility, the polymer having reverse wavelength dispersibility may form a compensation film for a variety of applications including those where a wide viewing angle is desired. Herein, the fabrication process of an optical film does not need an additional coextrusion or lamination process and thus, may effectively improve processibility and economic feasibility.

In another embodiment, the optical film having reverse wavelength dispersibility may be fabricated by copolymerizing the negative and positive birefringence monomers to form a polymer, and coextruding the polymer with a positive birefringence resin to provide the negative birefringence optical film, or laminating an optical film including the negative birefringence polymer with a film including a positive birefringence resin, but is not limited thereto.

According to another embodiment a display device including the optical film is provided. In an embodiment, the display device may be a liquid crystal display ("LCD"), an organic light emitting diode ("OLED"), and the like, but is not limited thereto.

Hereinafter, the display device, for example a liquid crystal display ("LCD") including the optical film, is described referring to FIG. 1.

FIG. 1 is a cross-sectional view showing an LCD according to an embodiment.

Referring to FIG. 1, the LCD according to an embodiment includes a liquid crystal display panel 10 and an optical film 20 disposed on both a lower part, e.g. a first display panel 100, opposite a liquid crystal layer 300, and an upper part, e.g. a second display panel 200, opposite the liquid crystal layer 300, of the liquid crystal display panel 10.

The liquid crystal display panel 10 may be a twisted nematic ("TN") mode panel, a patterned vertical alignment ("PVA") mode panel, or the like, but is not limited thereto.

The liquid crystal display panel 10 includes a first display panel 100, a second display panel 200, and a liquid crystal layer 300 interposed between the first display panel 100 and the second display panel 200.

The first display panel 100 may include, for example, a thin film transistor ("TFT", not shown) and a first field generating electrode (not shown) connected to TFT sequentially disposed on a substrate (not shown). The second display panel 200 may include, for example, a color filter (not shown) and a second field generating electrode (not shown) sequentially disposed on the substrate.

The liquid crystal layer 300 may include a plurality of liquid crystal molecules. The liquid crystal molecules may have positive or negative dielectric anisotropy. When the liquid crystal molecules have positive dielectric anisotropy, the long axis thereof may be aligned substantially parallel to the surface of the first display panel 100 and the second display panel 200 when not applying an electric field, and may be aligned substantially perpendicular to the surface of the first display panel 100 and the second display panel 200 when applying an electric field.

In an embodiment, when the liquid crystal molecules have negative anisotropy, the long axis thereof may be aligned substantially perpendicular to the surface of the first display panel 100 and the second display panel 200 when not applying an electric field, and may be aligned substantially parallel to the surface of the first display panel 100 and the second display panel 200 when applying an electric field.

The optical films 20 are disposed on an outside surface of the liquid crystal display panel 10. Referring to FIG. 1, although the optical films 20 are shown to be disposed on both the upper part, e.g. the second display panel 200, opposite the liquid crystal layer 300, and lower part, e.g. the first display panel 100, opposite the liquid crystal layer 300, of the liquid crystal display panel 10, in an alternative embodiment (not shown) the optical film 20 may be disposed on either the upper part, or the lower, part of liquid crystal display panel 10.

As described above, the optical film 20 may be an elongated film including the polymer including a repeating unit A including a repeating unit represented by the following Chemical Formulas 1 to 3, or a combination thereof; and a repeating unit B derived from a monomer including an unsaturated bond copolymerizable with the repeating unit A, and may act as a compensation film.

Hereinafter, the embodiments are illustrated in more detail with reference to examples. However, the following are exemplary embodiments of the disclosure, and the disclosure is not limited thereto.

PREPARATION OF MONOMER

Synthesis Example 1

A solution of 0.025 mmol of furan and 0.025 mmol of N-(1,3,5-trimethylphenyl)maleimide in 0.5 ml of ionic liquid [Mim]Tf$_2$N is stirred at 40° C., under N$_2$ atmosphere, to carry out Diels-Alder reactions. Then, the solution is extracted with diethylether 10 ml (×5) and the combined extracts are evaporated in vacuo. To a residue is added 0.012 mmol of p-xylene. Then, the products are purified by silica gel chromatography (50% EtOAc/hexane) to prepare a compound represented by the Chemical Formula 41-1.

Chemical Formula 41-1

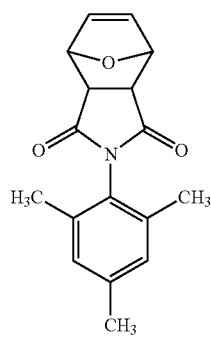

Synthesis Example 2

A compound represented by the Chemical Formula 41-2 is prepared according to the same method as Synthesis Example 1, except for using N-cyclohexylmaleimide instead of N-(1,3,5-trimethylphenyl)maleimide.

Chemical Formula 41-2

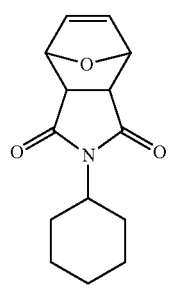

Synthesis Example 3

A compound represented by the Chemical Formula 41-3 is prepared according to the same method as Synthesis Example 1, except for using N-octylmaleimide instead of N-(1,3,5-trimethylphenyl)maleimide.

Chemical Formula 41-3

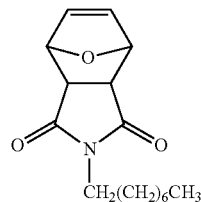

Synthesis Example 4

A compound represented by the Chemical Formula 42-1 is prepared from a commercial product (TCI, Japan).

Chemical Formula 42-1

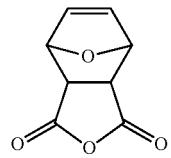

Synthesis Example 5

0.64 mmol of ethylene (CH$_2$CH$_2$) and 12.8 mmol of furan are added at 0° C. in 0.5 ml of dichloromethane. After stirring the reaction mixture for 20 hours at the same temperature, aqueous NaHCO$_3$ is added. After filtration of the inorganic materials, the organic materials are extracted with CHCl$_3$ (×3) and the combined organic phase is dried over anhydrous MgSO$_4$, filtered, and concentrated in vacuo. Then, the products are purified by silica gel chromatography (acetate/hexane=1/10–1/1) to prepare a compound represented by the Chemical Formula 43-1.

Chemical Formula 43-1

Synthesis Example 6

A compound represented by the Chemical Formula 43-2 is prepared according to the same method as Synthesis Example 5, except for using 2-butene (CH$_3$CHCHCH$_3$) instead of ethylene.

Chemical Formula 43-2

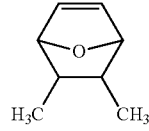

Synthesis Example 7

A compound represented by the Chemical Formula 46-1 is prepared according to the same method as Synthesis Example 1, except for using N-benzylmaleimide instead of N-(1,3,5-trimethylphenyl)maleimide.

Chemical Formula 46-1

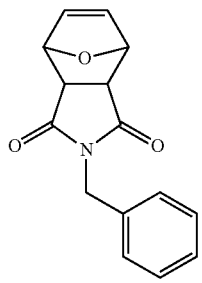

Synthesis Example 8

A compound represented by the Chemical Formula 46-2 is prepared according to the same method as Synthesis Example 1, except for using N-naphtylmaleimide instead of N-(1,3,5-trimethylphenyl)maleimide.

Chemical Formula 46-2

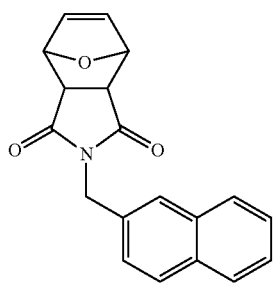

Synthesis Example 9

A compound represented by the Chemical Formula 46-3 is prepared according to the same method as Synthesis Example 1, except for using N-biphenylmaleimide instead of N-(1,3,5-trimethylphenyl)maleimide.

Chemical Formula 46-3

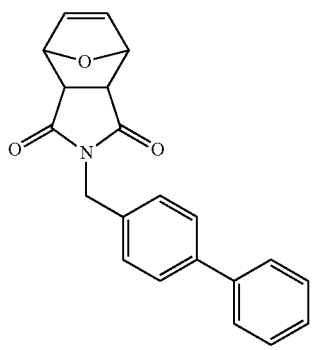 [SMILES: O=C1C2C3C=CC(O3)C2C(=O)N1Cc1ccc(-c2ccccc2)cc1]

Synthesis Example 10

A compound represented by the Chemical Formula 47-1 is prepared according to the same method as Synthesis Example 5, except for using phenyl acrylate instead of ethylene.

Chemical Formula 47-1

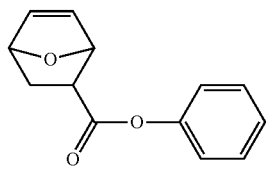

Synthesis Example 11

A compound represented by the Chemical Formula 47-4 is prepared according to the same method as Synthesis Example 5, except for using biphenyl acrylate instead of ethylene.

Chemical Formula 47-4

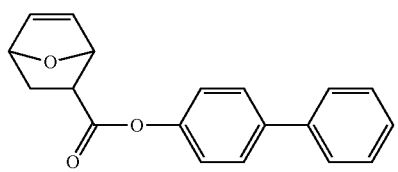

Preparation of Polymer for Optical Film

Example 1

The polymer is prepared according to the following Reaction Scheme 1.

Reaction Scheme 1

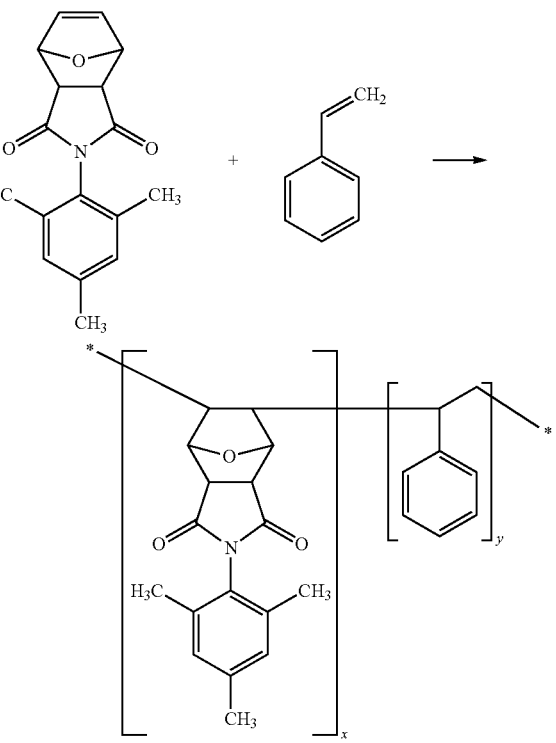

In Reaction Scheme 1, a mole ratio of x:y is 10:90.

Specifically, 10 grams (g) (35.3 millimoles (mmol)) of the compound prepared according to Synthesis Example 1 is mixed with 33.08 g (317.7 mmol) of styrene and 21.54 g of toluene. The compound represented by the following Chemical Formula 41-1 is referred to in Eur. J. Org. Chem. 2009, pp. 3635-3642 and Chem. Res. Chinese. Universities 2009, 25(3), pp. 161-168.

Then, 0.043 g of 2,2'-azobis(2-methylbutyronitrile) ("AIBN", Sigma-Aldrich Co. Ltd.) is added to the mixture. The resulting mixture is agitated under a nitrogen ($N_2$) atmosphere at about 60° C. for about 24 hours, preparing a white solid polymer. A yield of the polymer is about 75%.

The polymer has a number average molecular weight ("Mn") of about 58,000 g/mol, a weight average molecular weight ("Mw") of about 140,000 g/mol, and a polydispersity index of about 2.41. In addition, the polymer has a refractive index of about 1.58.

Example 2

The polymer is prepared according to the following Reaction Scheme 2.

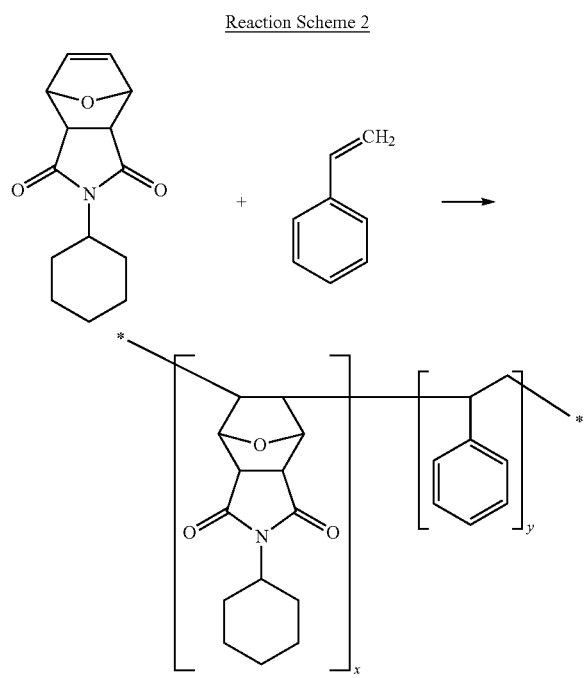

Reaction Scheme 2

In Reaction Scheme 2, a mole ratio of x:y is 10:90.

Specifically, 5 g (20.219 mmol) of the compound prepared according to Synthesis Example 2 is mixed with 18.95 g (181.97 mmol) of styrene and 11.97 g of toluene.

Then, 0.024 g of 2,2'-azobis (2-methylbutyronitrile) ("AIBN", Sigma-Aldrich Co. Ltd.) is added to the mixture. The resulting mixture is agitated under a nitrogen ($N_2$) atmosphere at about 60° C. for about 24 hours, preparing a white solid polymer. A yield of the polymer is about 70%.

The polymer has a number average molecular weight ("Mn") of about 63,000 g/mol, a weight average molecular weight ("Mw") of about 147,000 g/mol, and a polydispersity index of about 2.33. In addition, the polymer has a refractive index of about 1.56.

Example 3

Preparation of Polymer

The polymer is prepared according to the following Reaction Scheme 3.

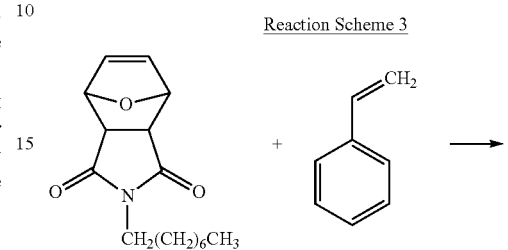

Reaction Scheme 3

In Reaction Scheme 3, a mole ratio of x:y is 10:90.

Specifically, 10 g (36.05 mmol) of the compound prepared according to Synthesis Example 3 is mixed with 33.8 g (324.45 mmol) of styrene and 21.9 g of toluene.

Then, 0.043 g of 2,2'-azobis(2-methylbutyronitrile) ("AIBN", Sigma-Aldrich Co. Ltd.) is added to the mixture. The resulting mixture is agitated for reaction under a nitrogen ($N_2$) atmosphere at about 60° C. for about 24 hours, preparing a white solid polymer. A yield of the polymer is about 80%.

The polymer has a number average molecular weight ("Mn") of about 58,000 g/mol, a weight average molecular weight ("Mw") of about 135,000 g/mol, and a polydispersity index of about 2.33. In addition, the polymer has a refractive index of about 1.56.

Example 4

The polymer is prepared according to the following Reaction Scheme 4.

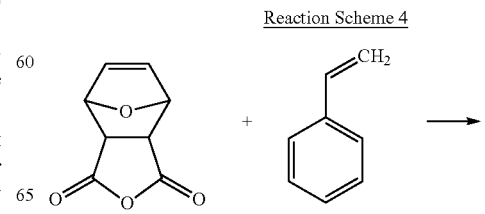

Reaction Scheme 4

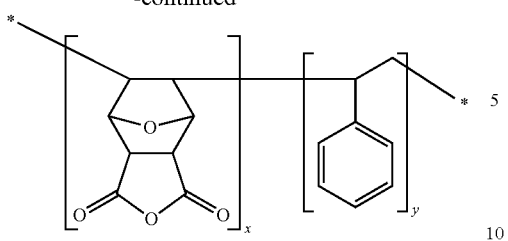

In Reaction Scheme 4, a mole ratio of x:y is 20:80.

Specifically, 10 g (60.193 mmol) of the compound prepared according to Synthesis Example 4 is mixed with 25.07 g (240.772 mmol) of styrene and 17.53 g of toluene.

Then, 0.044 g of Perhexa C-40 (NOF Co., Japan) is added to the mixture. The resulting mixture is agitated under a nitrogen ($N_2$) atmosphere at about 110° C. for about 24 hours, preparing a white solid polymer. A yield of the polymer is about 50%.

The polymer has a number average molecular weight ("Mn") of about 54,000 g/mol, a weight average molecular weight ("Mw") of about 145,000 g/mol, and a polydispersity index of about 2.69. In addition, the polymer has a refractive index of about 1.58.

Example 5

The polymer is prepared according to the following Reaction Scheme 5.

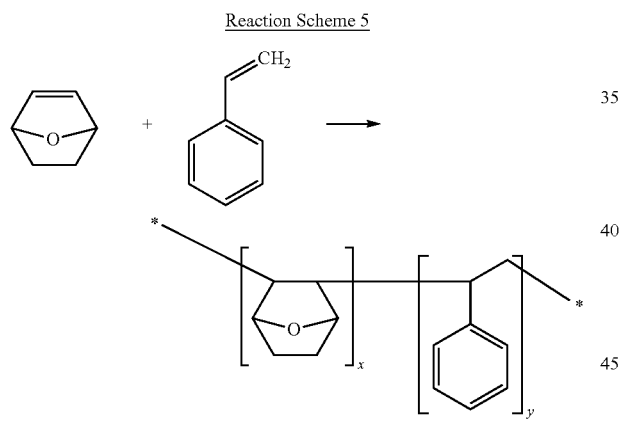

In Reaction Scheme 5, a mole ratio of x:y is 10:90.

Specifically, 1 g (10.40 mmol) of the compound prepared according to Synthesis Example 5 is mixed with 9.75 g (93.61 mmol) of styrene and 5.38 g of toluene.

Then, 0.01 g of Perhexa C-40 (NOF Co., Japan) is added to the mixture. The resulting mixture is agitated under a nitrogen ($N_2$) atmosphere at about 110° C. for about 24 hours, preparing a white solid polymer. A yield of the polymer is about 70%.

The polymer has a number average molecular weight ("Mn") of about 58,000 g/mol, a weight average molecular weight ("Mw") of about 150,000 g/mol, and a polydispersity index of about 2.59. In addition, the polymer has a refractive index of about 1.57.

Example 6

The polymer is prepared according to the following Reaction Scheme 6.

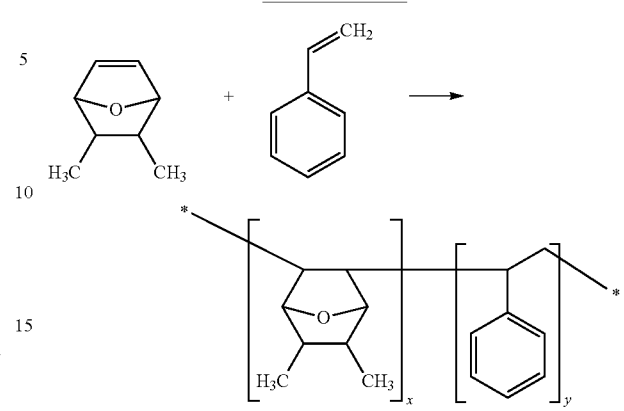

In Reaction Scheme 6, a mole ratio of x:y is 10:90.

Specifically, 1 g (8.05 mmol) of the compound prepared according to Synthesis Example 6 is mixed with 7.54 g (72.45 mmol) of styrene and 4.27 g of toluene.

Then, 0.008 g of Perhexa C-40 (NOF Co., Japan) is added to the mixture. The resulting mixture is agitated for reaction under a nitrogen ($N_2$) atmosphere at about 110° C. for about 24 hours, preparing a white solid polymer. A yield of the polymer is about 73%.

The polymer has a number average molecular weight ("Mn") of about 61,000 g/mol, a weight average molecular weight ("Mw") of about 160,000 g/mol, and a polydispersity index of about 2.62. In addition, the polymer has a refractive index of about 1.57.

Example 7

The polymer is prepared according to the following Reaction Scheme 7.

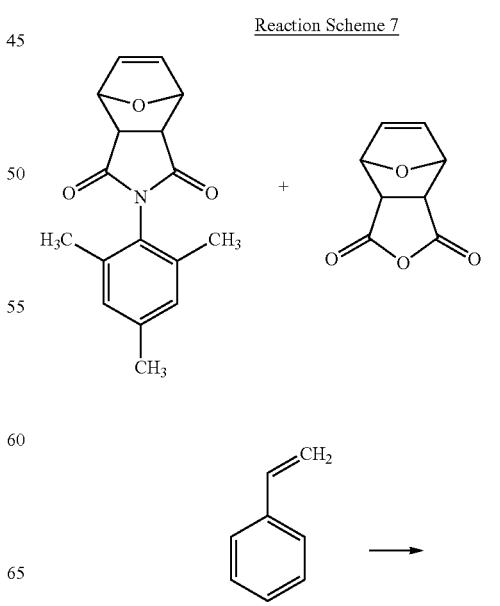

-continued

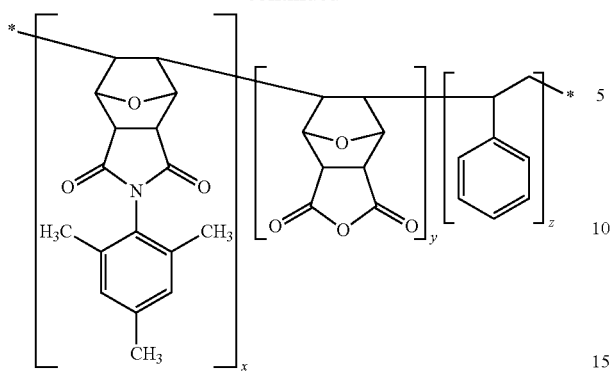

In Reaction Scheme 7, a mole ratio of x:y:z is 10:10:80.

Specifically, 10 g (35.29 mmol) of the compound prepared according to Synthesis Example 1 and 5.86 g (35.29 mmol) of the compound prepared according to Synthesis Example 4 are mixed with 29.4 g (282.32 mmol) of 22.63 g of styrene and toluene.

Then, 0.045 g of 2,2'-azobis (2-methylbutyronitrile) ("AIBN", Sigma-Aldrich Co., Ltd.) is added to the mixture. The resulting mixture is agitated for reaction under a nitrogen ($N_2$) atmosphere at about 60° C. for about 24 hours, preparing a white solid polymer. A yield of the polymer is about 76%.

The polymer has a number average molecular weight ("Mn") of about 63,000 g/mol, a weight average molecular weight ("Mw") of about 160,000 g/mol, and a polydispersity index of about 2.54. In addition, the polymer has a refractive index of about 1.58.

Example 8

The polymer is prepared according to the following Reaction Scheme 8.

Reaction Scheme 8

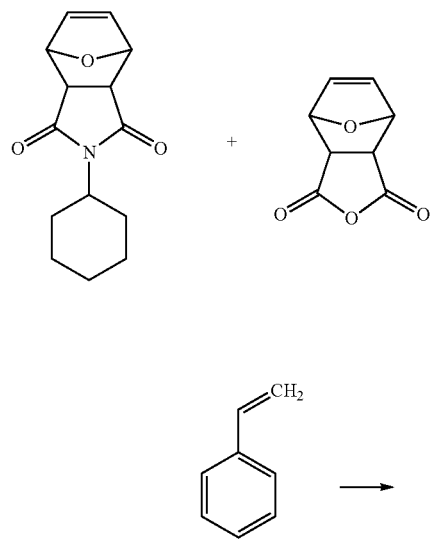

-continued

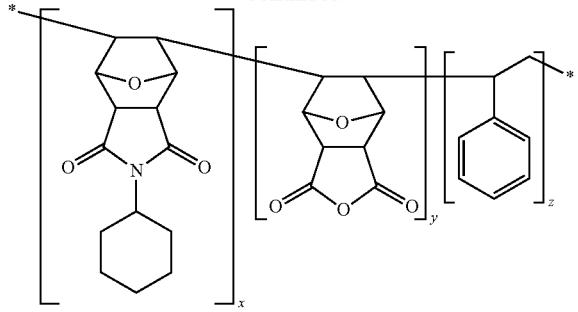

In Reaction Scheme 8, a mole ratio of x:y:z is 10:10:80.

Specifically, 10 g (40.43 mmol) of the compound prepared according to Synthesis Example 2 and 6.71 g (40.43 mmol) of the compound prepared according to Synthesis Example 4 are mixed with 33.68 g (323.44 mmol) of styrene and 25.2 g of toluene.

Then, 0.05 g of 2,2'-azobis(2-methylbutyronitrile) ("AIBN", Sigma-Aldrich Co., Ltd.) is added to the mixture. The resulting mixture is agitated for reaction under a nitrogen ($N_2$) atmosphere at about 60° C. for about 24 hours, preparing a white solid polymer. A yield of the polymer is about 80%.

The polymer has a number average molecular weight ("Mn") of about 65,000 g/mol, a weight average molecular weight ("Mw") of about 157,000 g/mol, and a polydispersity index of about 2.42. In addition, the polymer has a refractive index of about 1.58.

Example 9

The polymer is prepared according to the following Reaction Scheme 9.

Reaction Scheme 9

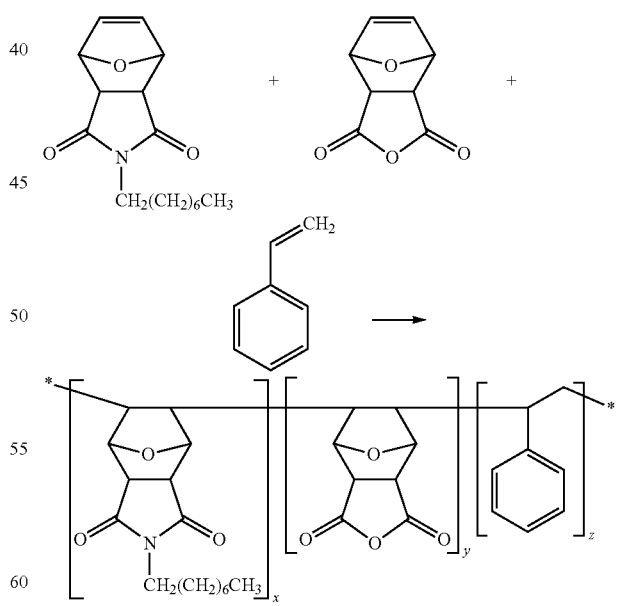

In Reaction Scheme 9, a mole ratio of x:y:z is 10:10:80.

Specifically, 10 g (36.05 mmol) of the compound prepared according to Synthesis Example 3 and 5.98 g (36.05 mmol) of the compound prepared according to Synthesis Example 4 are mixed with 30 g (288.4 mmol) of styrene and 23 g of toluene.

Then, 0.045 g of 2,2'-azobis (2-methylbutyronitrile) ("AIBN", Sigma-Aldrich Co., Ltd.) is added to the mixture. The resulting mixture is agitated for reaction under a nitrogen ($N_2$) atmosphere at about 60° C. for about 24 hours, preparing a white solid polymer. A yield of the polymer is about 80%.

The polymer has a number average molecular weight ("Mn") of about 64,000 g/mol, a weight average molecular weight ("Mw") of about 168,000 g/mol, and a polydispersity index of about 2.63. In addition, the polymer has a refractive index of about 1.58.

Example 10

The polymer is prepared according to the following Reaction Scheme 10.

Reaction Scheme 10

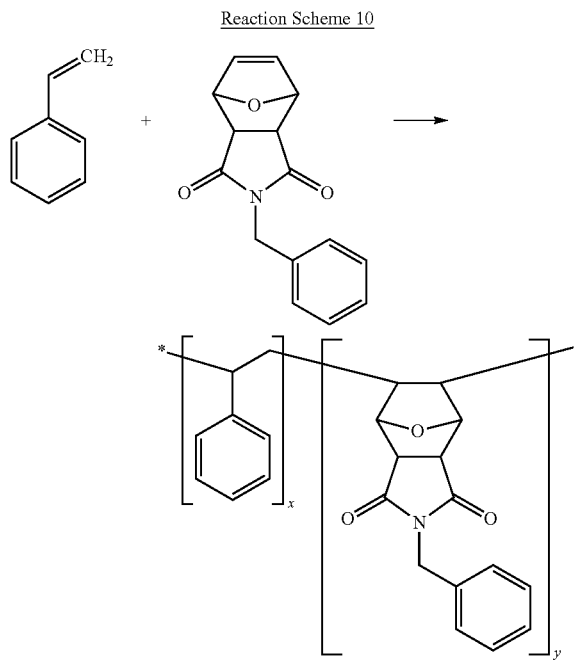

In Reaction Scheme 10, a mole ratio of x:y is 1:4.

Specifically, 49 g (192 mmol) of the compound prepared according to Synthesis Example 7 is mixed with 5 g (48 mmol) of styrene and 27 g of toluene.

Then, 0.054 g of 2,2'-azobis(2-methylbutyronitrile) ("AIBN", Sigma-Aldrich Co., Ltd.) is added to the mixture. The resulting mixture is agitated for reaction under a nitrogen ($N_2$) atmosphere at about 60° C. for about 24 hours, preparing a white solid polymer. A yield of the polymer is about 85%.

The polymer has a number average molecular weight ("Mn") of about 68,000 g/mol, a weight average molecular weight ("Mw") of about 157,000 g/mol, and a polydispersity index of about 2.31. In addition, the polymer has a refractive index of about 1.57.

Example 11

The polymer is prepared according to the following Reaction Scheme 11.

Reaction Scheme 11

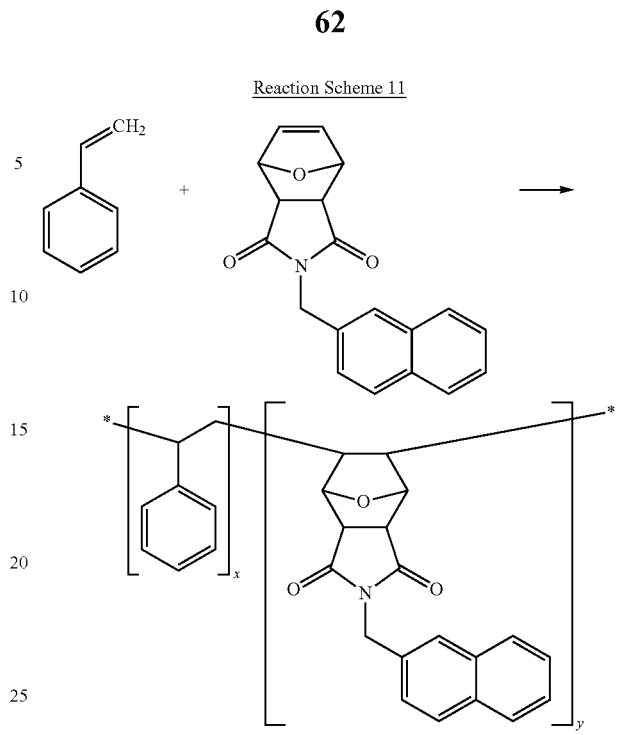

In Reaction Scheme 11, a mole ratio of x:y is 1:3.

Specifically, 8.79 g (28.8 mmol) of the compound prepared according to Synthesis Example 8 is mixed with 1 g (9.6 mmol) of styrene and 5 g of toluene.

Then, 0.01 g of 2,2'-azobis(2-methylbutyronitrile) ("AIBN", Sigma-Aldrich Co. Ltd.) is added to the mixture. The resulting mixture is agitated for reaction under a nitrogen ($N_2$) atmosphere at about 60° C. for about 24 hours, preparing a white solid polymer. A yield of the polymer is about 76%.

The polymer has a number average molecular weight ("Mn") of about 53,000 g/mol, a weight average molecular weight ("Mw") of about 143,000 g/mol, and a polydispersity index of about 2.70. In addition, the polymer has a refractive index of about 1.56.

Example 12

The polymer is prepared according to the following Reaction Scheme 12.

Reaction Scheme 12

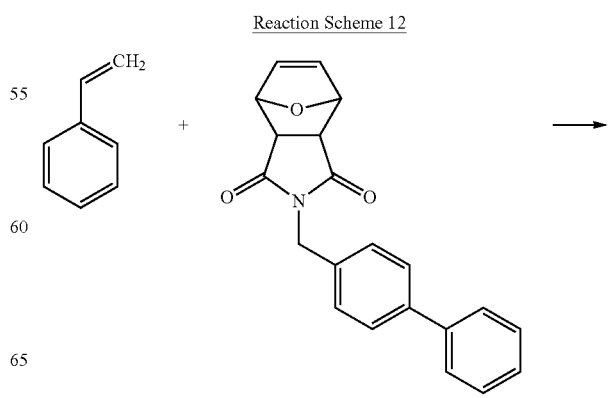

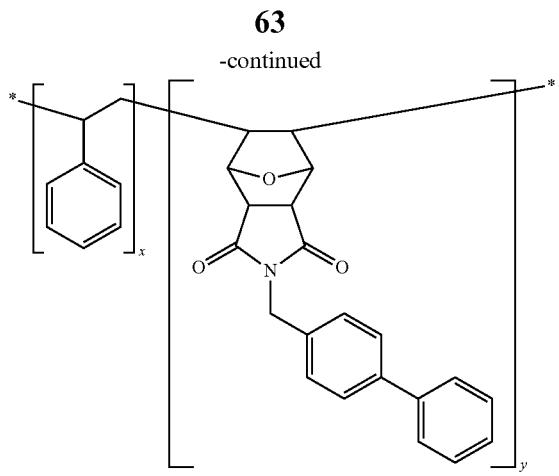

In Reaction Scheme 12, a mole ratio of x:y is 1:3.

Specifically, 9.54 g (28.8 mmol) of the compound prepared according to Synthesis Example 9 is mixed with 1 g (9.6 mmol) of styrene and 5.3 g of toluene.

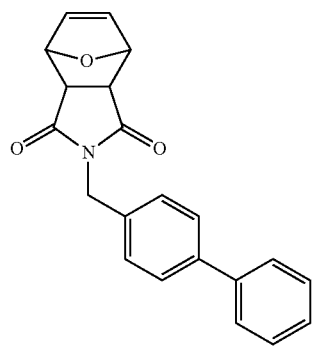

Then, 0.01 g of 2,2'-azobis (2-methylbutyronitrile) ("AIBN", Sigma-Aldrich Co., Ltd.) is added to the mixture. The resulting mixture is agitated for reaction under a nitrogen ($N_2$) atmosphere at about 60° C. for about 24 hours, preparing a white solid polymer. A yield of the polymer is about 70%.

The polymer has a number average molecular weight ("Mn") of about 60,000 g/mol, a weight average molecular weight ("Mw") of about 162,000 g/mol, and a polydispersity index of about 2.70. In addition, the polymer has a refractive index of about 1.56.

Example 13

The polymer is prepared according to the following Reaction Scheme 13.

Reaction Scheme 13

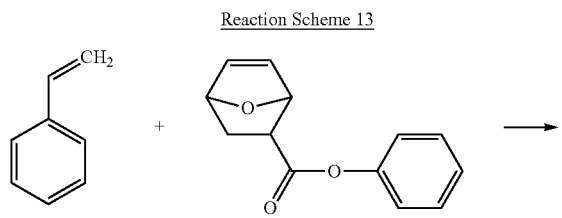

In Reaction Scheme 13, a mole ratio of x:y is 1:6.

Specifically, 12.45 g (57.6 mmol) of the compound prepared according to Synthesis Example 10 is mixed with 1 g (9.6 mmol) of styrene and 6.7 g of toluene.

Then, 0.013 g of Perhexa C-40 (NOF Co., Japan) is added to the mixture. The resulting mixture is agitated for reaction under a nitrogen ($N_2$) atmosphere at about 110° C. for about 24 hours, preparing a white solid polymer. A yield of the polymer is about 73%.

The polymer has a number average molecular weight ("Mn") of about 63,000 g/mol, a weight average molecular weight ("Mw") of about 173,000 g/mol, and a polydispersity index of about 2.75. In addition, the polymer has a refractive index of about 1.57.

Example 14

The polymer is prepared according to the following Reaction Scheme 14.

Reaction Scheme 14

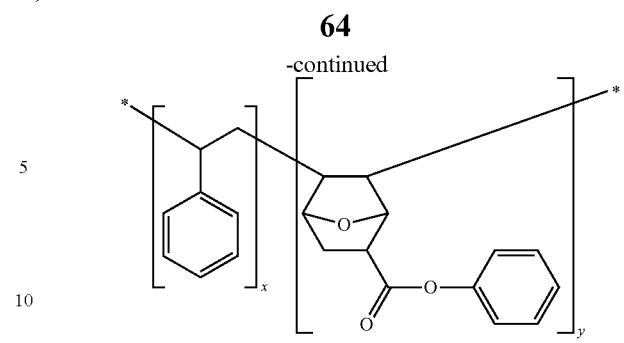

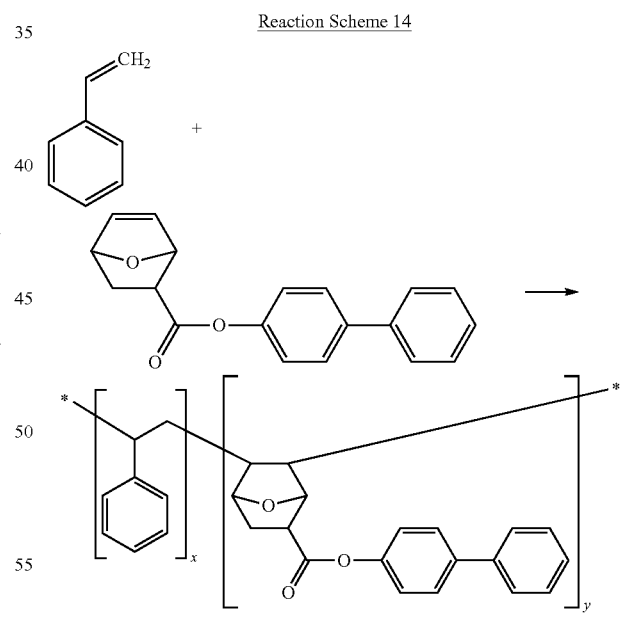

In Reaction Scheme 14, a mole ratio of x:y is 1:4.5.

Specifically, 13.3 g (43.2 mmol) of the compound prepared according to Synthesis Example 11 is mixed with 1 g (9.6 mmol) of styrene and 7.2 g of toluene.

Then, 0.014 g of Perhexa C-40 (NOF Co., Japan) is added to the mixture. The resulting mixture is agitated under a nitrogen ($N_2$) atmosphere at about 110° C. for about 24 hours, preparing a white solid polymer. A yield of the polymer is about 70%.

The polymer has a number average molecular weight ("Mn") of about 53,000 g/mol, a weight average molecular weight ("Mw") of about 149,000 g/mol, and a polydispersity index of about 2.81. In addition, the polymer has a refractive index of about 1.57.

Comparative Example 1

A polymer is prepared according to the same as method as in Example 1 except for using 35.3 mmol of a compound represented by the following Chemical Formula 30 (TCI Co., Ltd, Japan) instead of the compound represented by the above Chemical Formula 21-1. A yield of the polymer is about 80%.

The polymer has a number average molecular weight ("Mn") of about 65,000 g/mol, a weight average molecular weight ("Mw") of about 158,000 g/mol, and a polydispersity index of about 2.43. In addition, the polymer has a refractive index of about 1.56.

Chemical Formula 30

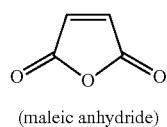

(maleic anhydride)

Preparation of Optical Film

Example 15

The polymer according to Example 1 is fused at about 250° C. and then, put in a mold and compressed, fabricating a sheet.

Next, the sheet is about 50% elongated at a temperature ranging from about 100° C. to about 120° C. and cooled down to room temperature, fabricating the optical film.

Example 16 to 28

Each optical film is fabricated according to the same method as in Example 15 except for respectively using the polymers according to Examples 2 to 14

The optical films are sequentially prepared according to Examples 16 to 28.

Comparative Example 2

An optical film is fabricated according to the same method as in Example 16 except for using the polymer according to Comparative Example 1 instead of the polymer according to Example 1.

Experimental Example 1

Glass Transition Temperature

About 10 mg of the polymers according to Examples 1 to 14 and Comparative Example 1 are respectively put on the holder of a differential scanning calorimeter ("DSC") equipment (METTLER TOLEDO Inc., Switzerland) and then, primarily scanned at a speed of about 10° C. per minute (° C./min) and a temperature ranging from about 30° C. to about 150° C., and secondarily at a temperature ranging from about 30° C. to about 300° C. The results are provided in the following Table 1.

Experimental Example 2

Wavelength Dispersion

The optical film specimens according to Examples 15 to 28 and Comparative Example 2 are each cut into a 2.5 centimeter (cm)×6.5 cm size and put on KOBRA-WPR (OSI Systems Inc., Japan) and then, measured regarding wavelength dispersion ranging from about 400 nm to about 700 nm. The results are provided in the following Table 1.

Experimental Example 3

Birefringence Characteristic Analysis

The optical films according to Examples 15 to 28 and Comparative Example 2 are measured regarding alignment angle using KOBRA-WPR(OSI Systems Inc., Japan) to identify their birefringence signs. A negative birefringent film has an alignment angle at about +90° or −90°, since polymers are aligned perpendicularly with the elongation direction thereof. A positive birefringent film has an alignment angle at about 0°, since molecules are aligned parallel to the polymer main chain. The alignment angles may vary depending on elongation ratio of a film, elongation temperature, specimen position, and the like and is reported to be negative (−) when found about +90° or −90° but positive (+) when found about 0° rather than given a specific value, since their absolute values are not a critical factor.

TABLE 1

| | Glass transition temperature (° C.) | | Alignment angle | Wavelength dispersion | |
|---|---|---|---|---|---|
| | | | | SWD* (450 nm/ 550 nm) | LWD** (650 nm/ 550 nm) |
| Example 1 | 120 | Example 15 | (−) | 1.06 | 0.97 |
| Example 2 | 110 | Example 16 | (−) | 1.07 | 0.97 |
| Example 3 | 95 | Example 17 | (−) | 1.07 | 0.96 |
| Example 4 | 150 | Example 18 | (−) | 1.07 | 0.96 |
| Example 5 | 115 | Example 19 | (−) | 1.06 | 0.96 |
| Example 6 | 113 | Example 20 | (−) | 1.06 | 0.96 |
| Example 7 | 133 | Example 21 | (−) | 1.07 | 0.97 |
| Example 8 | 125 | Example 22 | (−) | 1.06 | 0.97 |
| Example 9 | 100 | Example 23 | (−) | 1.07 | 0.96 |
| Example 10 | 100 | Example 24 | (+) | 0.99 | 1.02 |
| Example 11 | 105 | Example 25 | (+) | 0.98 | 1.04 |
| Example 12 | 103 | Example 26 | (+) | 0.98 | 1.03 |
| Example 13 | 110 | Example 27 | (+) | 0.97 | 1.04 |
| Example 14 | 115 | Example 28 | (+) | 0.96 | 1.06 |
| Comparative Example 1 | 125 | Comparative Example 2 | (−) | 1.06 | 0.96 |

*SWD: short wavelength dispersion of the in-plane phase-difference value ($R_e$)
**LWD: long wavelength dispersion of the in-plane phase-difference value ($R_e$)

Referring to Table 1, the polymers according to Examples 1 to 14 have a glass transition temperature ranging from about 95° C. to about 150° C., which is similar to that of a commonly-used positive birefringence polymer, resulting in little if any difference between the glass transition temperature of the polymer, and the positive birefringence polymer. Accordingly, the resulting polymers may solve a problem that might arise when a glass transition temperature ("$T_g$") difference exists between the polymer and the commonly-used positive birefringence polymer On the other hand, a polymer prepared using the compound represented by the above Chemical Formulas 41-1, 41-2, 41-3, 42-1, 43-1, 43-2, 46-1, 46-2, 46-3, 47-1, or 47-4, in a mole ratio relative to styrene in Examples 1 to 14, may have higher heat resistance.

In addition, the optical films according to Examples 15 to 23 have negative birefringence, and a short wavelength dispersion of the in-plane phase-difference value ($R_e$) (450 nm/550 nm) greater than about 1 and a long wavelength dispersion of the in-plane phase-difference value ($R_e$) (650 nm/550 nm) less than about 1 and thus, may have optical characteristic equivalent to that of the optical film according to Comparative Example 2.

In addition, the optical films according to Examples 24 to 28 have positive birefringence, and a short wavelength dispersion of the in-plane phase-difference value ($R_e$) (450 nm/550 nm) less than about 1 and a long wavelength dispersion of the in-plane phase-difference value ($R_e$) (650 nm/550 nm) greater than about 1, resulting in reverse wavelength dispersibility.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An optical film comprising:
a polymer comprising a repeating unit A comprising a repeating unit represented by the following Chemical Formulas 1 to 3, or a combination thereof; and a repeating unit B derived from a monomer comprising an unsaturated bond copolymerizable with the repeating unit A,
wherein the optical film has a short wavelength dispersion of an in-plane phase-difference value ($R_e$) (450 nanometers/550 nanometers) ranging from about 0.81 to about 1.20, and a long wavelength dispersion of an in-plane phase-difference value ($R_e$) (650 nanometers/550 nanometers) ranging from about 0.90 to about 1.18:

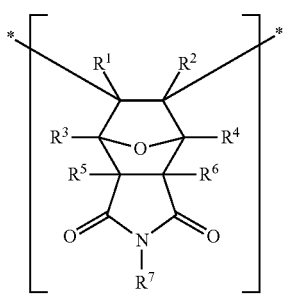

Chemical Formula 1 wherein, in Chemical Formula 1,
$R^1$ to $R^6$ are the same or different in each repeating unit and are each independently hydrogen, or a substituted or unsubstituted C1 to C10 aliphatic group, and
$R^7$ is the same or different in each repeating unit, and each is independently hydrogen, a substituted or unsubstituted C1 to C30 aliphatic group, a substituted or unsubstituted C3 to C30 alicyclic group, a substituted or unsubstituted C6 to C30 aromatic group, or a substituted or unsubstituted C2 to C30 heterocyclic group,
wherein the alicyclic group, aromatic group, or heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—,

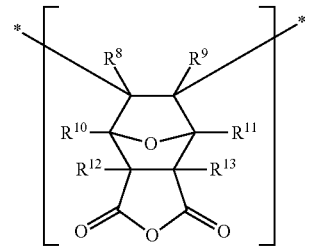

Chemical Formula 2 wherein, in Chemical Formula 2,
$R^8$ to $R^{13}$ are the same or different in each repeating unit and are each independently hydrogen, or a substituted or unsubstituted C1 to C10 aliphatic group,

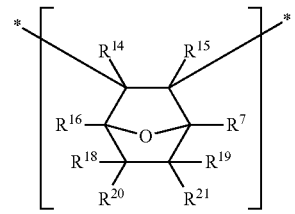

Chemical Formula 3 wherein, in Chemical Formula 3,
$R^{14}$ to $R^{19}$ are the same or different in each repeating unit and are each independently hydrogen, or a substituted or unsubstituted C1 to C10 aliphatic group, and
$R^{20}$ and $R^{21}$ are the same or different in each repeating unit and are each independently hydrogen, a substituted or unsubstituted C1 to C30 aliphatic group, a substituted or unsubstituted C3 to C30 alicyclic group, a substituted or unsubstituted C6 to C30 aromatic group, or a substituted or unsubstituted C2 to C30 heterocyclic group,
wherein the alicyclic group, aromatic group, or heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

2. The optical film of claim 1, wherein the repeating unit represented by the Chemical Formula 1 comprises a repeating unit represented by the following Chemical Formulas 11-1 to 11-3, or a combination thereof:

Chemical Formula 11-1

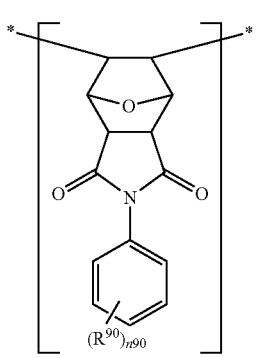

Chemical Formula 11-2

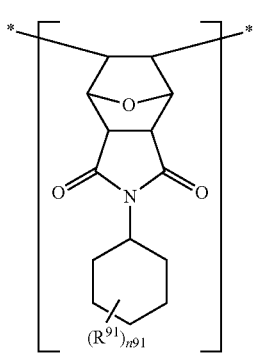

Chemical Formula 11-3

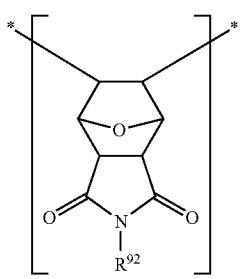

wherein, in Chemical Formulas 11-1 to 11-3,
R$^{90}$ to R$^{92}$ are the same or different in each repeating unit and are each independently hydrogen, or a C1 to C20 alkyl group,
n90 is the same or different in each repeating unit, and each is independently an integer ranging from 0 to 5, and
n91 is the same or different in each repeating unit, and each is independently an integer ranging from 0 to 11.

3. The optical film of claim 1, wherein the repeating unit represented by the Chemical Formula 1 comprises a repeating unit represented by the following Chemical Formulas 21-1 to 21-3, or a combination thereof, the repeating unit represented by the Chemical Formula 2 comprises a repeating unit represented by the following Chemical Formula 22-1, and the repeating unit represented by the Chemical Formula 3 comprises a repeating unit represented by the following Chemical Formula 23-1, a repeating unit represented by the following Chemical Formula 23-2, or a combination thereof:

Chemical Formula 21-1

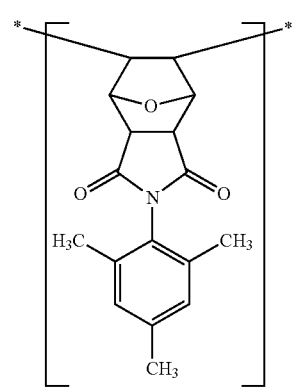

Chemical Formula 21-2

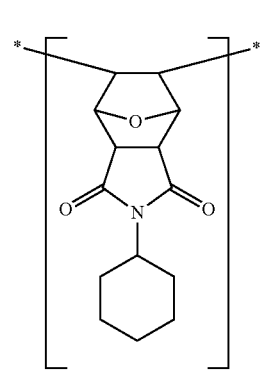

Chemical Formula 21-3

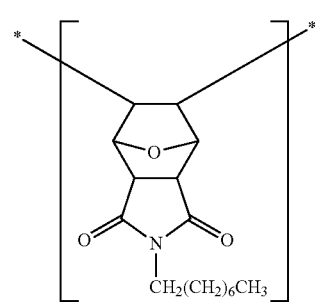

Chemical Formula 22-1

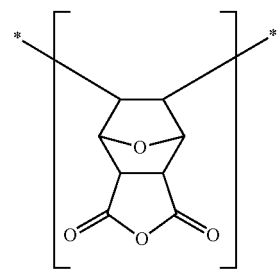

Chemical Formula 23-1

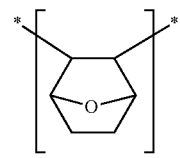

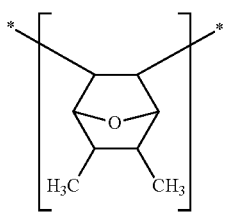

Chemical Formula 23-2

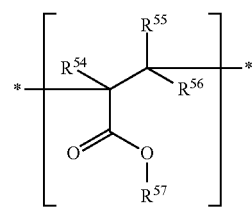

Chemical Formula 5 wherein, in Chemical Formula 5, $R^{54}$ is the same or different in each repeating unit and each is independently hydrogen, or a methyl group, $R^{55}$ and $R^{56}$ are the same or different in each repeating unit and are each independently hydrogen, or a substituted or unsubstituted C1 to C10 aliphatic group, and $R^{57}$ is the same or different in each repeating unit and each is independently a substituted or unsubstituted C1 to C30 aliphatic group, a substituted or unsubstituted C3 to C30 alicyclic group, a substituted or unsubstituted C6 to C30 aromatic group, or a substituted or unsubstituted C2 to C30 heterocyclic group, wherein the alicyclic group, aromatic group, or heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

4. The optical film of claim 1, wherein the repeating unit B comprises a repeating unit represented by the following Chemical Formula 4, a repeating unit represented by the following Chemical Formula 5, or a combination thereof:

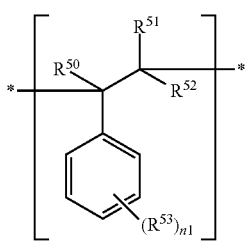

Chemical Formula 4 wherein, in Chemical Formula 4, $R^{50}$ to $R^{52}$ are the same or different in each repeating unit and are each independently hydrogen, or a substituted or unsubstituted C1 to C10 aliphatic group, $R^{53}$ is the same or different in each repeating unit, and each is independently hydrogen, a halogen, a substituted or unsubstituted C1 to C30 aliphatic group, a substituted or unsubstituted C3 to C30 alicyclic group, a substituted or unsubstituted C6 to C30 aromatic group, a substituted or unsubstituted C2 to C30 heterocyclic group, a substituted or unsubstituted C1 to C30 alkoxy group, a substituted or unsubstituted C6 to C30 an aryloxy group, a substituted or unsubstituted C2 to C30 ester group, a carboxyl group, or —N(R$^{100}$)(R$^{101}$), (wherein R$^{100}$ and R$^{101}$ are the same or different and are each independently hydrogen, or a substituted or unsubstituted C1 to C10 aliphatic group), wherein the alicyclic group, aromatic group, or heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—, and n1 is the same or different in each repeating unit, and each is independently an integer ranging from 0 to 5,

5. The optical film of claim 4, wherein the repeating unit represented by the Chemical Formula 4 comprises a repeating unit represented by the following Chemical Formula 24-1, a repeating unit represented by the following Chemical Formula 24-2, or a combination thereof, and the repeating unit represented by the Chemical Formula 5 comprises a repeating unit represented by the following Chemical Formula 25-1, a repeating unit represented by the following Chemical Formula 25-2, or a combination thereof:

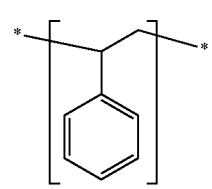

Chemical Formula 24-1

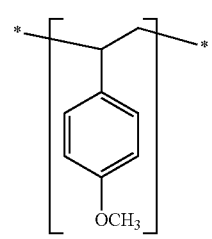

Chemical Formula 24-2

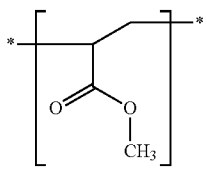

Chemical Formula 25-1

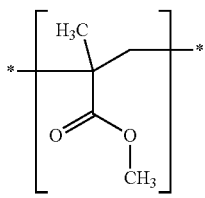

Chemical Formula 25-2

6. The optical film of claim 4, wherein the repeating unit B further comprises a repeating unit represented by the following Chemical Formula 8:

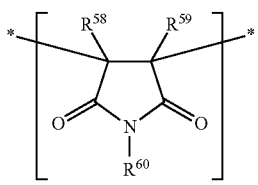

Chemical Formula 8 wherein, in Chemical Formula 8,
$R^{58}$ and $R^{59}$ are the same or different in each repeating unit and are each independently hydrogen, or a substituted or unsubstituted C1 to C10 aliphatic group, and
$R^{60}$ is the same or different in each repeating unit, and each is independently hydrogen, a substituted or unsubstituted C1 to C30 aliphatic group, a substituted or unsubstituted C3 to C30 alicyclic group, a substituted or unsubstituted C6 to C30 aromatic group, or a substituted or unsubstituted C2 to C30 heterocyclic group,
wherein the alicyclic group, aromatic group, or heterocyclic group is present singularly; at least two of the alicyclic group, aromatic group, or heterocyclic group are linked to provide a condensed ring; or at least two of the alicyclic group, aromatic group, or heterocyclic group are linked via a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

7. The optical film of claim 1, wherein the polymer comprises the repeating unit A and the repeating unit B in a mole ratio of about 0.1:99.9 to about 50:50.

8. The optical film of claim 1, wherein the optical film has an in-plane phase-difference value ($R_e$) of about 0 nanometers to about 500 nanometers at a wavelength of about 550 nanometers, and a thickness direction phase-difference value ($R_{th}$) of about 0 nanometers to about −1000 nanometers at a wavelength of about 550 nanometers.

9. The optical film of claim 1, wherein the polymer has a number average molecular weight (Mn) of about 10,000 grams per mole to about 200,000 grams per mole.

10. The optical film of claim 1, wherein the polymer has a polydispersity index of about 1.0 to about 5.0.

11. The optical film of claim 1, wherein the polymer has a refractive index of about 1.40 to about 1.69.

12. The optical film of claim 1, wherein the polymer has a glass transition temperature ($T_g$) of about 80° C. to about 200° C.

13. The optical film of claim 1, wherein the optical film has an average light transmittance of greater than or equal to about 80% at a wavelength range of about 380 nanometers to about 780 nanometers.

14. The optical film of claim 1, wherein the optical film has a haze of less than or equal to about 3%.

15. The optical film of claim 1, wherein the optical film has a glass transition temperature ($T_g$) of about 80° C. to about 200° C.

16. A display device comprising the optical film according to claim 1.

17. A method of preparing the optical film according to claim 1, the method comprising:
melting a polymer to form a melted polymer;
compressing the melted polymer to form a sheet; and
elongating the sheet to provide the optical film.

* * * * *